(12) United States Patent
Groth et al.

(10) Patent No.: US 10,997,513 B1
(45) Date of Patent: May 4, 2021

(54) DYNAMIC, RISK INFORMED DECISION SUPPORT SYSTEMS AND METHODS

(71) Applicant: National Technology & Engineering Solutions of Sandia, LLC, Albuquerque, NM (US)

(72) Inventors: Katrina Groth, Albuquerque, NM (US); Matthew R. Denman, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 1024 days.

(21) Appl. No.: 14/669,107

(22) Filed: Mar. 26, 2015

Related U.S. Application Data

(60) Provisional application No. 61/974,187, filed on Apr. 2, 2014.

(51) Int. Cl.
*G06N 7/00* (2006.01)
*G06N 5/04* (2006.01)

(52) U.S. Cl.
CPC ............ *G06N 7/005* (2013.01); *G06N 5/045* (2013.01)

(58) Field of Classification Search
CPC .................................................... G06N 99/00
See application file for complete search history.

(56) References Cited

PUBLICATIONS

H. Boudali and J.B. Dugan, "A discrete-time Bayesian network reliability modeling and analysis framework", Reliability Eng. and System Savety, vol. 87, 2005, pp. 337-349. (Year: 2005).*
M. Kloos and J. Peschke, "Consideration of human actions in combination with the probabilistic dynamics method Monte Carlo dynamic event tree", Proc. IMechE vol. 222, 2008, pp. 303-313. (Year: 2008).*
J. Magee, "Decision Trees for Decision Making", Harvard Business Review, Jul. 1964, 23 pages. (Year: 1964).*
Yang, B.S. "VIBEX: An expert system for vibration fault diagnosis of rotating machinery using decision tree and decision table", Expert Sys. with Applicaitons, vol. 28, 2005, pp. 735-742. (Year: 2005).*
Gelgele, H., and Wang, K., "An expert system for engine fault diagnosis: development and application", J. Intelligent Manufacturing, vol. 9, 1998, pp. 539-545. (Year: 1998).*

* cited by examiner

*Primary Examiner* — Vincent Gonzales
(74) *Attorney, Agent, or Firm* — Daniel J. Jenkins

(57) ABSTRACT

The present disclosure is directed to a decision support system or tool based on a Bayesian Network (BN) framework. The diagnostic support tool is created by using advanced Probabilistic Risk Assessment (PRA) method(s) to construct Bayesian Networks (BNs) that form a Bayesian Decision Support Process (BDSP) to provide science-based decision support for understanding and managing events in complex systems. In an embodiment, the PRA method(s) may include Discrete Dynamic Event Trees (DDETs) and simulations.

18 Claims, 21 Drawing Sheets

Figure 15

For FV failure

| Ranked Observ. | Diagnostic Value |
|---|---|
| T_CoreExit (t=46) | 0.319 |
| Lev_RPV | 0.316 |
| T_CoreExit (t=146) | 0.232 |
| P_RPV (t=160) | 0.224 |
| P_RPV (t=128) | 0.217 |
| T_CoreExit (t=108) | 0.202 |
| Lev_RPV (t=157) | 0.200 |
| P_RPV (t=58) | 0.197 |
| Lev_RPV (t=68) | 0.195 |
| T_CoreExit | 0.191 |
| P_RPV | 0.191 |
| Lev_RPV (t=159) | 0.188 |
| Lev_RPV (t=151) | 0.187 |
| T_CoreExit (t=44) | 0.184 |
| P_RPV (t=79) | 0.184 |
| Lev_RPV (t=46) | 0.182 |
| T_CoreExit (t=123) | 0.176 |
| P_RPV (t=101) | 0.175 |
| T_CoreExit (t=72) | 0.174 |
| T_CoreExit (t=63) | 0.171 |
| Lev_RPV (t=106) | 0.167 |

Suggested checks: Core exit temp (t46), RPV level(t0)

For SRV failure

| Ranked Observ. | Diagnostic Value |
|---|---|
| Lev_RPV | 0.896 |
| P_RPV | 0.856 |
| T_CoreExit | 0.856 |
| T_CoreExit (t=46) | 0.651 |
| P_RPV (t=160) | 0.650 |
| T_CoreExit (t=146) | 0.615 |
| P_RPV (t=79) | 0.485 |
| P_RPV (t=25) | 0.464 |
| T_CoreExit (t=72) | 0.443 |
| T_CoreExit (t=63) | 0.439 |
| Lev_RPV (t=160) | 0.433 |
| Lev_RPV (t=61) | 0.421 |
| T_CoreExit (t=44) | 0.414 |
| P_RPV (t=58) | 0.406 |
| Lev_RPV (t=156) | 0.406 |
| T_CoreExit (t=123) | 0.382 |
| Lev_RPV (t=108) | 0.372 |
| Lev_RPV (t=161) | 0.364 |
| T_CoreExit (t=98) | 0.361 |
| P_RPV (t=128) | 0.359 |
| T_CoreExit (t=70) | 0.358 |

Suggested checks: RPV Press(t0), RPV level(t0)

Figure 16

DYNAMIC, RISK INFORMED DECISION SUPPORT SYSTEMS AND METHODS

CROSS-REFERENCE TO RELATED APPLICATIONS

This application claims benefit of U.S. Provisional Patent Application No. 61/974,187, "DYNAMIC, RISK INFORMED DECISION SUPPORT SYSTEM AND METHOD," filed Apr. 2, 2014, the disclosure of which is incorporated by reference herein in its entirety.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

FIELD

The present disclosure is generally directed to systems safety and more particularly to diagnosis of system degradation using a probabilistic simulation set (e.g., dynamic event tree and systems analysis models) to build Bayesian Network-based dynamic procedures to support accident management.

BACKGROUND

Procedures (including, but not limited to, EOPs [Emergency Operating Procedures], SAMGs [Severe Accident Management Guidelines]) serve as a critical resource for helping operating crews respond to deviations from expected conditions, unanticipated events, and accidents in nuclear power plants. During an event, procedures provide support for collecting information, understanding trends, and projecting ahead to accurately assess the state of a nuclear power plant and to plan and execute control actions in a timely manner.

Currently, paper-based procedures are developed from a combination of expert judgments and best-estimates analyses with limited insight from static risk assessments.

However, procedure developers cannot anticipate every possible event or accident scenario, which may lead to gaps in procedure coverage in terms of both breadth of scenario coverage and depth of phenomenological detail.

Risk-informed thinking is currently revolutionizing the regulatory environment by helping the NRC and plants identify the most important risk drivers.

This same type of thinking can also revolutionize the procedural environment by providing decision support for operating crews, technical support centers, emergency planners, and others during an event.

Traditional Probabilistic Risk Assessment (PRA) methods (e.g., static fault-tree/event-tree methods, without enhancements) will have limited capability to improve accident management due to the difficulty of relating a static, simplified modeling framework to instrument readings in dynamic situations. However, advanced or dynamic PRA methods can be used to achieve this goal.

A 2009 NRC Scoping Study set forth requirements for advanced PRA methods. These requirements include reducing modeling simplifications (enhanced phenomenological modeling), improving consideration of human-system interactions, utilizing advances in computational capabilities, and characterizing uncertainty in analyses. These improvements can enable better use of advanced PRA results to facilitate decision making.

One method for advanced PRA involves the use of Discrete Dynamic Event Trees (DDETs) coupled together with a systems analysis code (e.g., Methods for Estimation of Leakages and Consequences of Releases (MELCOR) severe accident analysis simulator or the RELAP plant response simulator). DDETs are powerful discrete simulation tools used for dynamic accident analysis. Scheduling programs such as the Analysis of Dynamic Accident Progression Trees (ADAPT) or RAVEN are used to conduct DDET analyses. This prior approach provides a process for extensive and comprehensive modeling of both the accident space and the plant response for a reactor. Using these dynamic computational methods allows greater structured analysis of the possible accident space than traditional PRA methods and provides estimates of instrumented parameters. In this disclosure, DDETs are coupled to the MELCOR computer code through ADAPT. The use of the BDSP method is not limited to these techniques and may also use techniques for generating accident scenarios (including expert judgment and best estimate approaches), other software systems designed to implement those techniques (e.g., ADAPT, ADS) and other simulation options (e.g., MAAP or RELAP), including multi-physics and severe accident simulators relevant to chemical processes and other industrial areas.

There is also a need for such accident analysis in other applications, such as, but not limited chemical and power industry operations. In addition, decision analysis may have other applications in other fields, such as, but not limited to instrument sensitivity studies, personnel training, procedures development, and safety assessment.

What is needed are methods and systems for generating comprehensive, detailed, context-specific procedures for decision management. In an embodiment, the methods and systems may be sued to generate comprehensive, detailed, context-specific procedures for accident management. The methods and systems must be capable of providing insight in faster-than-real-time, and must be able to handle uncertainty about the scenario and the phenomena and incomplete or impect information. The systems and methods must provide support for diagnosing [with uncertainty] the state of the reactor (or other system) based on a variable subset of observable plant parameters. In essence, the systems and methods must bring together the expertise of the engineering community (via the large scale multi-physics models, advanced computation and simulation techniques), and put that expertise in the hands of decision makers faced with rapidly evolving, complex scenarios. Such a dynamic tool provided by the systems and methods can be used to enable operators, technical support personnel, and other decision makers to respond to a myriad of decision scenarios, and in an embodiment, accident scenarios, including those that have not yet been identified or analyzed during expert-based development of procedures.

One advantage of the present disclosure is to increase plant safety and in system availability by enabling more timely and accurate diagnosis of and response to plant faults.

Another advantage of the present disclosure is to provide a methodology can be used to generate "starter" procedures for reactor designs without such procedures. Having these starter procedures enables (people) to conduct a range of safety analyses (including PRA evaluations) on various plant designs; this offers the ability to generate and evaluate safety cases necessary for addressing regulatory questions, including staffing and passive system performance.

Another advantage of the present disclosure is that the method can be tied into "online" system monitoring and control. Tying the dynamic procedure system into the plant monitoring system can enable automatic updating of the status of vital plant components and systems and later inform dynamic procedure creation and updating Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

FIG. 15 illustrates diagnostic value of various plant parameters that can be used to diagnose status of SRV, and further illustrates how this diagnostic value is updated after additional observations are made according to an embodiment of the disclosure.

FIG. 16 shows diagnostic values for FV (right) and SRV (left) failure according to an embodiment of the disclosure.

FIG. 20 illustrates an embodiment of a system for performing the operations of the disclosed methods according to the disclosure.

SUMMARY

Figure 1:
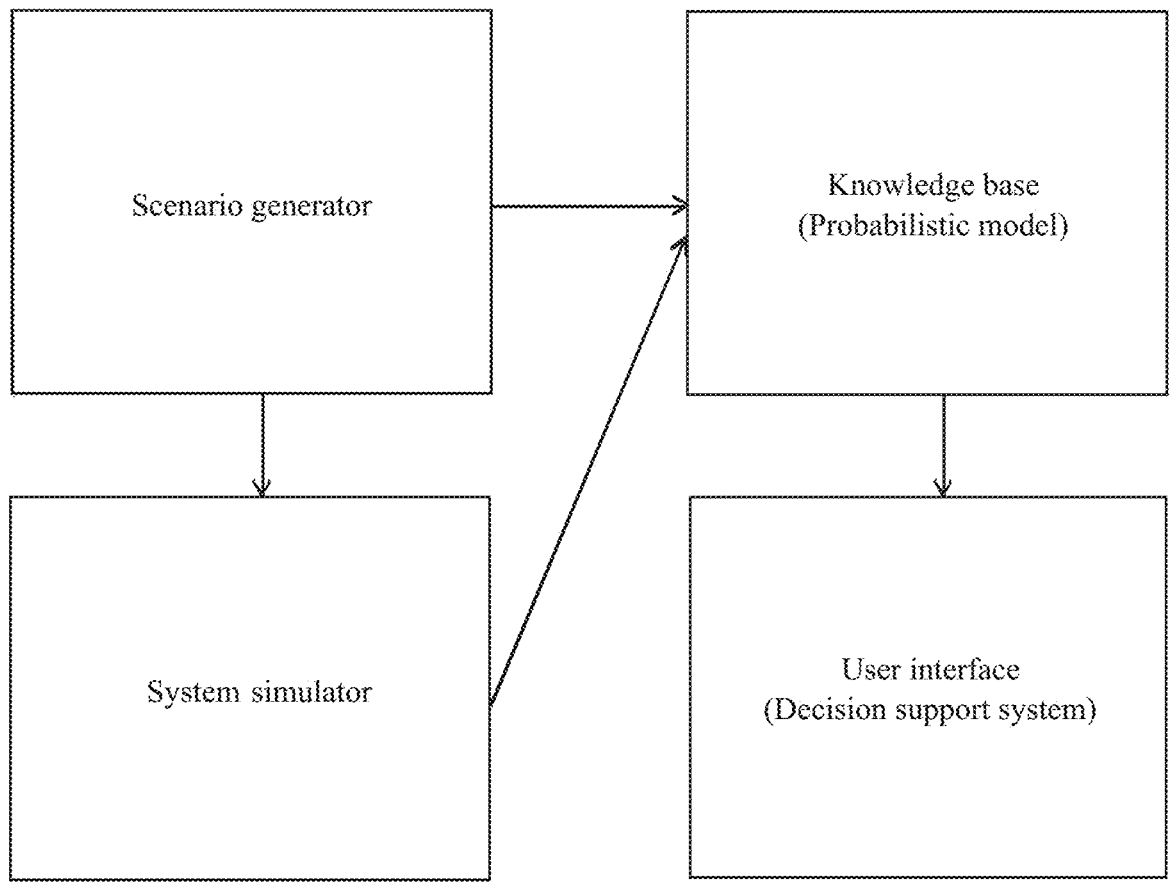
FIG. 1 is a schematic of a diagnostic support process for generating risk-informed diagnostic support according to an embodiment of the disclosure.

According to an embodiment of the disclosure, a diagnostic support system and methodology (diagnostic support tool) for creating risk-informed decision guidelines for complex systems is disclosed. The complex system may be, but is not limited to nuclear plant accident analysis and procedures, fossil fuels, wind, solar, thermal and hydroelectric plant accident analysis and procedures, chemical and power industry operations, waste repository accident analysis and procedures, uranium plant processing analysis and procedures, water treatment plant analysis and procedures, instrument sensitivity studies, personnel training, procedures development, and safety assessment. In an embodiment, the risk-informed decision guidelines may include Smart Severe Accident Management Guidelines (SAMGs)), Emergency Operating Procedures (EOPs) and other types of procedures.

The diagnostic support tool is created by using advanced Probabilistic Risk Assessment (PRA) method(s) to construct Bayesian Networks (BNs) that form a Bayesian Decision Support Process (BDSP) to provide science-based decision support for understanding and managing events in complex systems. In an embodiment, the PRA method(s) may include Discrete Dynamic Event Trees (DDETs) and simulations. In an embodiment, the PRA method(s) may include Discrete Dynamic Event Trees (DDETs) and MELCOR simulations. MELCOR is an engineering-level computer code designed to analyze severe accidents in nuclear power plants and nuclear fuel cycle facilities. MELCOR applications estimate severe accident source terms and their associated sensitivities and uncertainties in a variety of regimes and scenarios. The BNs may be static or dynamic.

In an embodiment, the BDSP may include human-system interaction models. In an embodiment, the BDSP may include a crew response simulation model (e.g., Information, Decision, and Action in a Crew Context (IDAC)). Human simulation models such as IDAC can be used to simulate crew responses, given a set of procedures. In this embodiment, the results can be used to address regulatory questions including staffing and passive system performance.

In an embodiment, the diagnostic support tool may be used to explore an extensive space of possible accident sequences and consequences in a nuclear reactor or other complex operation; the results of these analyses provide comprehensive insight into the likelihood of various accident scenarios and into how various scenarios manifest in observable parameter changes. The BN encodes the advanced PRA results in an efficient computational structure, which probabilistically maps the relationships between observable parameters and unobservable accident sequences (which are known in the advanced PRA simulations, but which are not known in the intended real-time uses of the BDSP). The BN, by nature of being a probabilistic model and through implementation of Bayesian inference processes, enables reasoning with uncertain and incomplete information (e.g., about the accident sequences and also about the parameters). This probabilistic encoding offers access to the multitude of PRA scenarios and associated simulation results without perfect/deterministic knowledge of the accident sequence in progress. The BDSP enables faster-than-real access to the PRA information, with or without knowledge of the accident sequence and reactor parameters. This insight can benefit operators, emergency personnel, NRC, and other parties interested in understanding and managing an evolving severe accident. The results of the BDSP can be harnessed to build decision support systems (DSS) that provide real-time insight during accidents or events.

A risk-informed SAMG created using the diagnostic support tool provides a comprehensive, detailed probabilistic map, relating system parameters (e.g., RPV water level) to known system states (e.g., a feed valve is open). This probabilistic model within the tool can be queried to provide predictions regarding events and parameters (either independently or jointly, simultaneously or in series) The use of such an approach elevates PRA from a static, a priori analysis framework to dynamic framework capable of providing real-time decision support.

According to an embodiment of the invention, a method for determining critical operations parameters and diagnosing unknown accidents for an extensive range of possible accident sequences is disclosed that includes coupling one or more probabilistic risk assessment methods with a Bayesian network decision support system, and generating a probabilistic map of relationships between known accident scenarios and observed plant parameters.

According to another embodiment of the disclosure, a method for constructing risk-informed decision guidelines is disclosed that includes coupling one or more probabilistic risk assessment methods with a Bayesian network decision support system, generating a probabilistic map of relationships between known accident scenarios and observed plant parameters, and using the probabilistic map to enable users to perform probabilistic queries to dynamically diagnosis specific faults, identify key indicators, and predict future plant parameters.

According to another embodiment of the disclosure, a BN analysis structure, which may be referred to as a Bayesian Decision Support Process (BDSP), is disclosed that provides a process for developing risk-informed procedures that provide an understanding of a severe accident that helps operators diagnose the system state and respond appropriately, before the plant reaches an unrecoverable or immitigable condition.

Other features and advantages of the present disclosure will be apparent from the following more detailed description of the preferred embodiment, taken in conjunction with the accompanying drawings which illustrate, by way of example, the principles of the disclosure.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present disclosure is directed to a diagnostic support tool that includes an analysis method or methodology including a Bayesian Decision Support Process (BDSP), which combines one or more scenario generation tools with system simulations and encodes these in a Bayesian Network (BN) decision support tool. The scenario generation tool may include discrete dynamic event trees (DDETs). The diagnostic support tool may optionally include additional modules for simulating other relevant systems, interactions, or processes, including crew responses, physical processes and external events. In an embodiment, the additional module may be, but is not limited to, a crew response simulation model. For example, a crew simulation model such as IDAC may be used.

The present disclosure is further directed to a diagnostic support system and methodology (diagnostic support tool) for creating risk-informed decision guidelines for complex systems is disclosed. The complex system may be, but is not limited to nuclear plant accident analysis and procedures, fossil fuels, wind, solar, thermal and hydroelectric plant accident analysis and procedures, chemical and power industry operations, waste repository accident analysis and procedures, uranium plant processing analysis and procedures, water treatment plant analysis and procedures, instrument sensitivity studies, personnel training, procedures development, and safety assessment. In an embodiment, the risk-informed decision guidelines may include Smart Severe Accident Management Guidelines (SAMGs)), Emergency Operating Procedures (EOPs) and other types of procedures.

The present disclosure is further directed to a methodology for generating the BN is based on leveraging best-available information from advanced probabilistic risk assessment PRA such as Discrete Dynamic Event Trees (DDET) coupled with severe accident simulations (e.g., MELCOR). The use of advanced, simulation-based PRA methods such as DDETs provides comprehensive analysis of possible accident scenarios. Coupling DDETs with MELCOR on a BN framework builds a map of the relationship between critical reactor parameters and known plant configurations during these accidents. The BN model synthesizes the information from the extensive set of DDET and MELCOR runs into a single framework to be used, in real-time, for supporting diagnosis and response planning in the face of potentially incomplete information about critical plant parameters and uncertainty about accident conditions.

FIG. 1 illustrates a generic process for executing a BDSP to generate a risk-informed diagnostic support tool. The proposed approach uses a scenario generator to drive a system simulator. Results from these analyses are encoded in a Bayesian Network (BN) knowledge base including a probabilistic model, which provides decision support to a user interface. In an embodiment, the scenario generator may be a discrete event simulator or expert-generated scenarios. In an embodiment, the discrete event simulator may be DDET. In an embodiment, the system simulator may be MELCOR.

The results of this tool may be used to create risk-informed SAMGs, which may be referred to as Advanced SAMGs (aSAMGs) or Smart SAMGs (sSAMGs). The sSAMGs may be in the form of a computer tool, manual (both computer and paper based) for providing real-time support for diagnosing the status of the system (and related equipment) and response planning support (probabilistic recommendations) during abnormal system events.

The disclosure is further explained by an exemplary detailed application to the nuclear industry, but it should understood that the tool may be applied to, but not limited to, any of the applications as discussed above.

Figure 2:
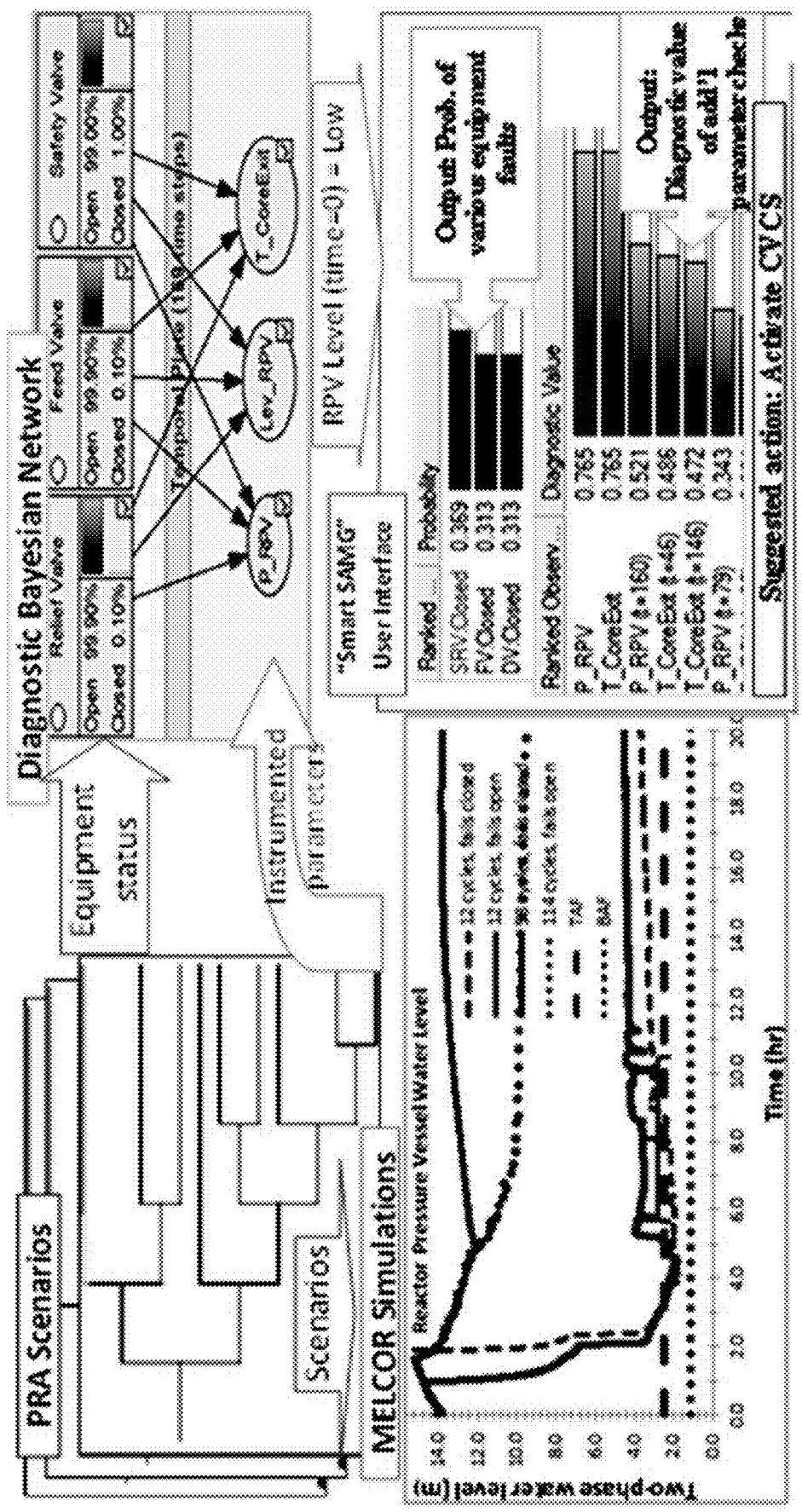
FIG. 2 is an illustration of a diagnostic support process as applied to the development of risk-informed "Smart SAMG" procedures for nuclear power plant diagnostic support according to an embodiment of the disclosure.

FIG. 2 illustrates the diagnostic support tool applied to a procedure for building a risk-informed SAMG for the nuclear industry according to an embodiment of the disclosure. In this embodiment, the scenarios are generated in Event Trees or DDETs and the systems analysis code is MELCOR. The proposed approach uses these advanced PRA outputs from the tool to build a BN capable of producing faster-than-real-time insight into the system state. As can be seen in FIG. 2, PRA scenarios with their associated probabilities and simulation, with their associated approximation of instrumentation outputs, are combined to inform a BN. The PRA scenarios provide information as to the reactor components that are relevant to each accident scenario, the possible states of those components, and the probability of each component state. Each scenario in the PRA represents a known configuration of plant components; for each PRA scenario, one or more simulation are run, each of which provides information on the parameter values or ranges for 100+ critical parameters in a reactor system.

According to an embodiment, a BDSP-based diagnostic support tool may include comprehensive analysis of the possible accident space for a given nuclear reactor design. The use of MELCOR, or similar dynamic simulator, provides the ability to simulate potential severe accident plant conditions and predict instrumentation readings on which the operators would be basing their decision. Encoding this information, plus information on likelihood of various failures, in a BN provides a BDSP tool that can be deployed in nuclear power plant control rooms for managing severe accidents as they occur. The BN would serve as a diagnosis support tool that, upon the onset of off-normal conditions, would process real time plant data, analyze that data in the context of the previously processed DDET plant simulations, and facilitate the operators' diagnosis of the off-normal conditions by prioritizing the plant conditions that would most likely be of relevance and importance to the mitigation of the off-normal conditions. This is a significant extension of the role of PRA, and is a radically different way of thinking about accident management.

According to an embodiment, a diagnostic support tool may also be extended to include a feedback loop that supports response planning for a given set of possible diagnoses. This embodiment, shown in FIG. 3, enables generating response plans and also enables enhancement of safety analyses. This embodiment can be used to model the impact of human actions on the plant response, or to incorporate human actions into safety analyses that would otherwise omit human actions (e.g., analyses where other procedures do not exist). In this embodiment, a first iteration of the BDSP within the tool is used to generate a diagnostic model. This diagnostic model is fed backward through the scenarios to determine operator actions that will optimize the response to the set of plausible diagnoses encoded in the BN.

The diagnostic support tool can be incorporated into a nuclear power plant's approach to developing and incorporating procedures, including SAMGs, which offers a number of benefits during the occurrence of events and severe accidents, including, but not limited to:
  Puts the best-available information from PRA and simulation community in the hands of decision makers;
  Enables faster crew response in time-critical situations;
  Reduces coordination/communication challenges that can hinder rapid response;
  Provides a framework for identifying and exploring potential alternative diagnoses that may manifest in the same set of observed symptoms
  Provides a framework for exploring possible impacts of for high consequence decisions before taking actions;
  Assist non-operators in understanding response plan implemented by operators.

The diagnostic support tool harnesses comprehensive accident scenarios explored by advanced PRA and the efficient computational structure of BNs, to provide comprehensive, real-time insight into severe accidents. The use of such an approach elevates PRA from a static, a prior analysis framework to provide dynamic, real-time decision support. The approach also elevates procedures from static decision support tools into dynamic, context-specific tools for guiding decisions under uncertainty.

The advanced PRA approach used in this embodiment combines DDETs with plant simulations to comprehensively model plant response under a significantly larger range of conditions than possible in traditional PRA approaches. This approach addresses the NRC's Scoping Study's criteria for an advanced PRA and accident sequence modeling methodology, (which includes phenomenological challenges, operator/crew response, and equipment failures) in a scrutable structure that facilitates regulatory decision making.

As can be seen in the embodiments, it is apparent that the process for developing risk-informed procedures can have far-reaching implications beyond PRA. Developing a big picture understanding of a complex scenario is nearly impossible when faced with a rapidly evolving severe accident, uncertain information, distributed expertise, and a large number of conflicting goals and priorities. The big picture understanding provided by the diagnostic support tool can help operators diagnose the system state and respond appropriately before the plant reaches an unrecoverable condition.

The BDSP-informed diagnostic support tool can be used to map the comprehensive space of possible accident sequences and consequences in a NPP. The results of these analyses can be aggregated and presented in decision support systems (DSS) that help provide risk-informed insight during severe accidents. This insight can benefit operators, emergency personnel, NRC, and other parties interested in obtaining faster-than-real-time understanding of a severe accident. The support tool's BDSP harnesses the power of comprehensive PRA and the efficient encoding of probabilistic models (BNs) to provide this faster-than-real-time decision support.

The diagnostic support tool's advanced, simulation-based PRA approaches can be used to explore thousands of accident scenarios. Coupling these scenarios with plant simulations allows prediction of plant parameters and consequences associated with each accident scenario. This provides in-depth modeling of the entire scenario. However, due to the complexity of models used in simulation-based PRA, this in-depth understanding cannot be obtained in real-time. To address this problem, the BDSP uses Bayesian Networks (BNs), which provide a way to synthesize and reduce this information into a framework that can be used for faster-than-real-time decision support.

Using the methodology shown in FIG. 2, a user of the diagnostic support tool can develop and execute a full spectrum of DDET/simulations to scope the state-space of the accident. This information is used in combination with basic PRA information to provide a detailed, probabilistic model of the accident sequence space. The resulting model is an extensive knowledge base covering a wide spectrum of possible accidents. This BDSP is a decision support system, which encodes the best-available knowledge from PRA to be used when needed.

Once developed, the diagnostic support tool can be used in real-time to facilitate diagnosis and response planning given whatever information is available about the plant state. The model can be used to dynamically update the situational awareness of the crew, which enables faster response time during critical scenarios. Furthermore, this generic PRA model will enable crews to respond to a myriad of accident conditions (including those that we have yet not anticipated) without exhaustive expert efforts to predict every possible bifurcation in an accident scenario.

The diagnostic support tool incorporates BNs, which offer a graphical and mathematical framework to formally integrate multiple types of information into decision making. BNs offer a language for understanding and documenting causal relationships among variables. Probabilities are used to summarize causal information. The BN framework enables reasoning with incomplete or imperfect information, about uncertain events. BDSP encodes a detailed knowledge base in a BN and enables that knowledge base to be used to reason about specific events, given new information (called evidence).

Mathematically, BNs consist of a directed acyclic graph and a complex probability distribution. The graph contains nodes (the set of relevant variables) and arcs (relationships among the variables). The quantitative aspect associates each node with a conditional probability function. The BN exploits the chain rule, conditional independence assumptions, and Bayes' Theorem to provide a powerful reasoning tool. The Bayesian updating process can be used repeatedly to conduct inference with any combination of evidence about model nodes, or to conduct inference about the evidence given the existing model.

BNs implement both forward reasoning and backward reasoning simultaneously. Forward propagation (inference) reasons from causes to effects (e.g., interpreting a new situation, predicting the probability of being in various states, conducting "what-if" analyses, or choosing a corrective action for a specific situation). Backward propagation (diagnosis) reasons from effects to causes, to understand why an event happens. By observing certain variables being in various states (e.g. knowing that temperature is high or pressure is low) they can enter that information in the network and get updated probabilities for unobserved variables. This is used to understand possible root causes given observed symptoms.

When operators cannot gather information (e.g., due to functional or physical unavailability of indicators) or they receive ambiguous information (e.g., due to indicators that were not designed for accident monitoring) there is said to be a state estimation problem. The BN can be used to help solve the state estimation problem, using observable information (effects) from the plant displays, to assist operators in diagnosing the system (causes). The same model can be used to help identify potential effects of various accident mitigation actions.

Example 1

Example 1 is case studies in which the process described in FIG. 2 is used to build a SAMG for diagnosing problems with the Emergency Core Cooling System (ECCS) of a generic integral Pressurized Water Reactor (iPWR), which has been simplified for this analysis.

Figure 4:
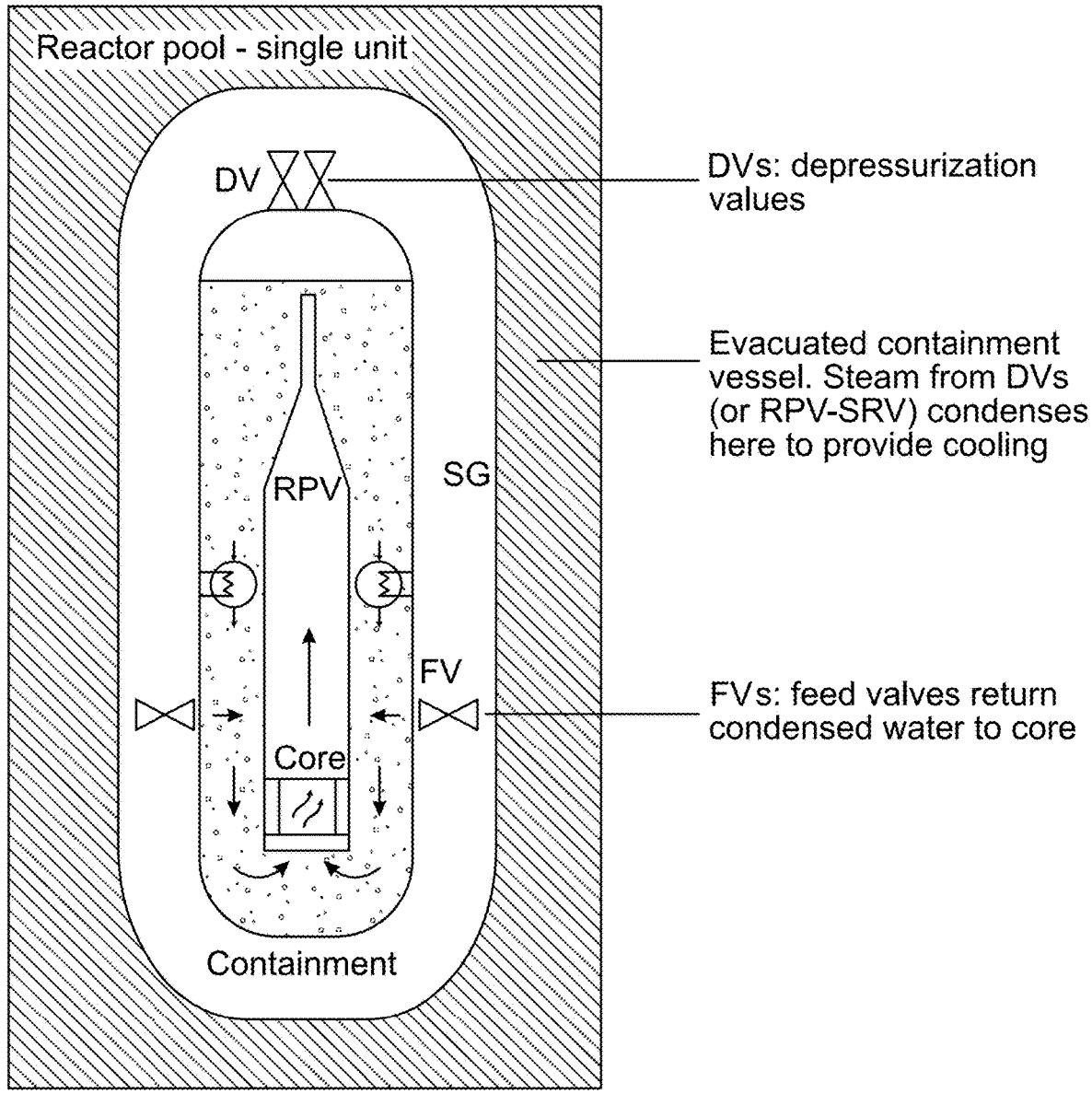
FIG. 4 shows a simplified model of the ECCS of a Generic Integral Pressurized Water Reactor (iPWR) according to an embodiment of the disclosure.

The generic iPWR model is a 120 Mega-Watt Thermal design with no reactor coolant pumps and a single Safety Relief Valve (SRV) off the pressurizer, which is located at top of the reactor pressure vessel (RPV). A simplified drawing of the reactor and the ECCS system can be seen in FIG. 4. The ECCS is comprised of a set of Depressurization Valves (DVs, top vent valves), and Feed Valves (FVs, bottom return valves) which serve to provide a heat transfer pathway from the core to the ultimate heat sink. In the generic iPWR model, the ultimate heat sink is a pool of water submerging a single iPWR module consisting of a steel containment vessel surrounding the RPV. In this example, failure of the ECCS system results from failure (in the closed position) of one or more valves (any of the DV, FV, and SRVs). While the SRV is not considered part of the ECCS system, for purposes of brevity, the term "ECCS failure" is used to represent failure of the ECCS valves and/or the SRV.

As is evident, the ECCS can fail in multiple ways. Depending on how the ECCS fails, the accident scenario progression will vary as there are multiple possible accident scenarios associated with the failure of the ECCS, including severe accident scenarios, as shown in Table 1. The goal of this example model is to support diagnosis of the configuration of ECCS system (and therefore infer the core damage status) to enable appropriate selection of mitigating actions.

TABLE 1

Summary of effects on core for given configurations of the DV, FV and SRV, generated from a series of MELCOR simulations.

| # SRV cycles | SRV fails closed | SRV fails open |
|---|---|---|
| Results from ADAPT branches with DV failure only | | |
| 12 | Small core damage only if high decay heat branch | Always core damage |
| 58 | No core damage | Always core damage |
| 114 | No core damage | No core damage |
| Results from ADAPT branches with FV failure only | | |
| 12 | Always core damage | Always core damage |
| 58 | Always core damage | Always core damage |
| 114 | Sometimes core damage | Sometimes core damage |
| Results from ADAPT branches with DV and FV | | |
| 12 | Always core damage | Always core damage |
| 58 | No core damage | Always core damage |
| 114 | No core damage | No core damage |

Figure 8:
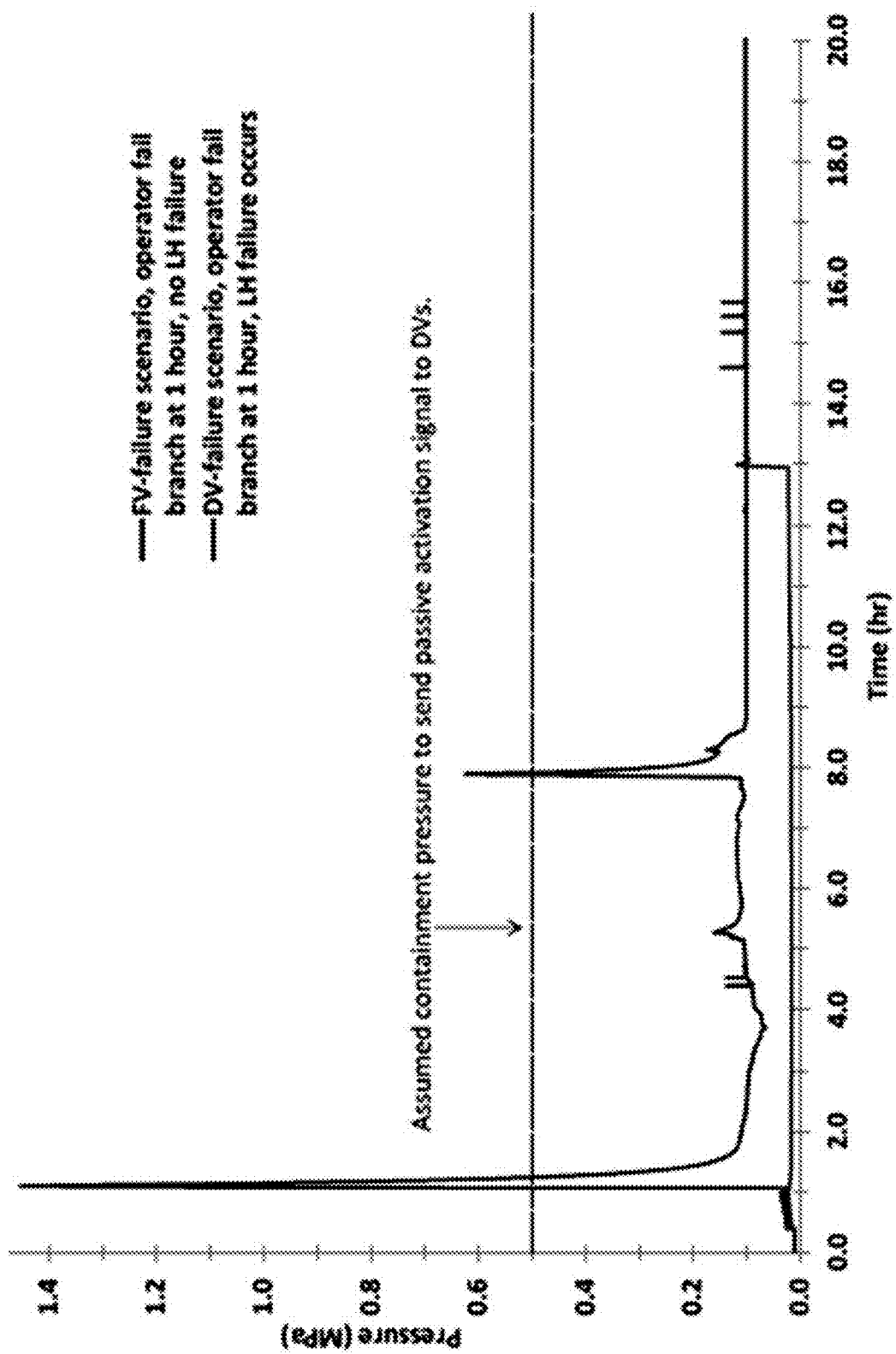
FIG. 8 shows a plot illustrating the different in key reactor parameter (containment pressure) for two different configurations of the ECCS valves according to an embodiment of the disclosure.
Figure 9:
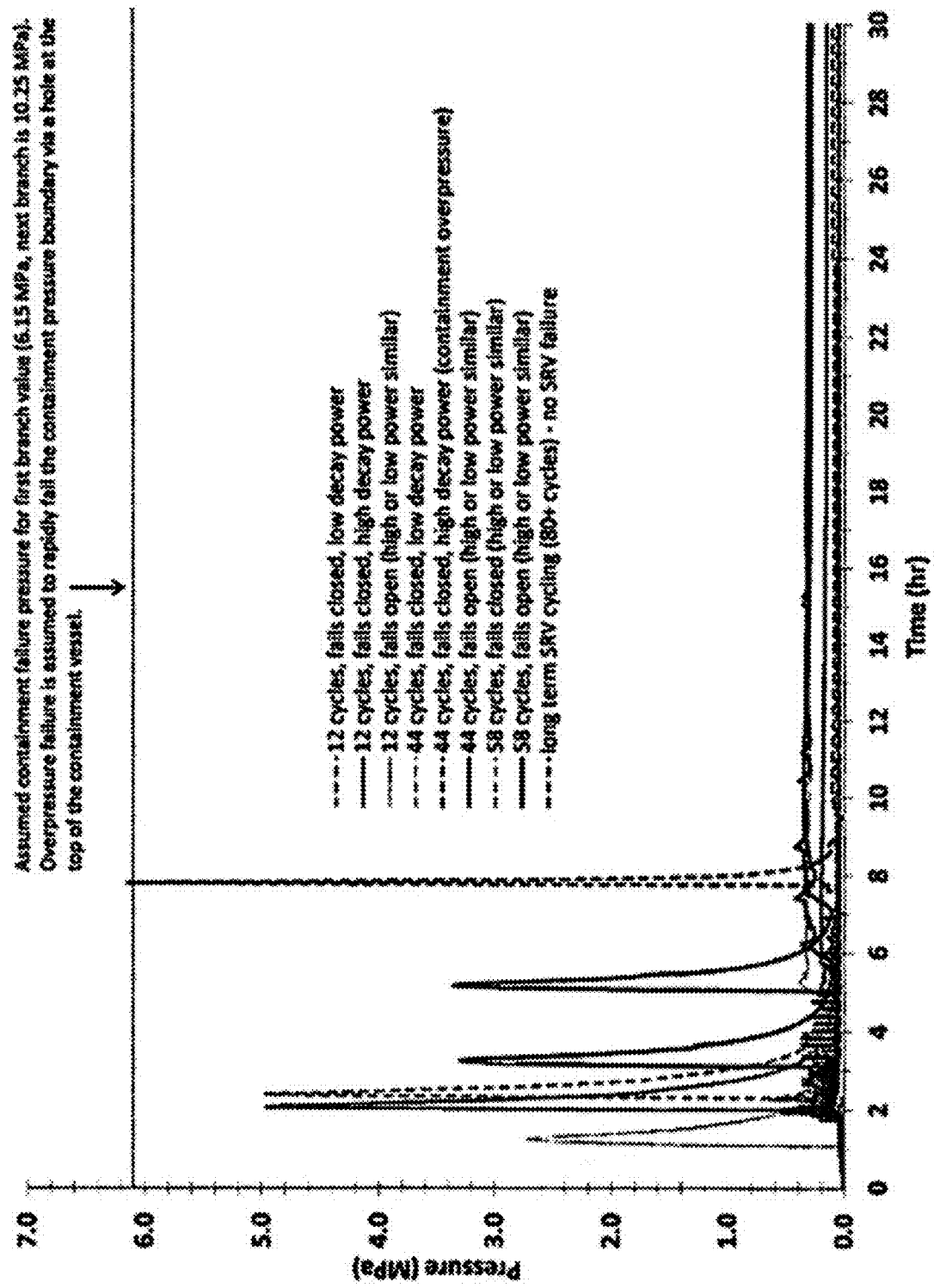
FIG. 9 shows a MELCOR simulation output of RPV pressure, illustrating that reactor parameters illustrate different behavior at different times, for known combinations of valve failures according to an embodiment of the disclosure.

The key reactor parameters which can result from various failures of the ECCS also vary, as shown in FIG. 8, which compares the different containment pressure behavior for a DV-failure scenario vs. a FV-failure scenario, as simulated in the iPWR MELCOR model. As is illustrated in FIG. 8, MELCOR predicts different observable reactor parameters for different valve configurations and different failure times. FIG. 9 aggregates MELCOR simulations for the cases where DV is failed closed, FV is open, and the SRV failure status varies.

In this example, the DDET (implemented in ADAPT) had branches for decay heat (high or low), reactor pool status, ECCS operation (modeled as combinations of DV-failure or FV-failure), RPV-SRV cycling and failure position, core degradation kinetics, and containment failure pressure. These dynamic variables are linked between ADAPT input and MELCOR control functions. The order of the branching events can vary; the timing and evolution of the scenarios is determined by MELCOR calculations. The series of simulations includes dozens of simulations of each possible combination of valve states.

As part of the inherent safety of the generic iPWR, most combinations of failure of the SRV and ECCS components will result no fuel damage (e.g., an accident, but not a severe accident). However, some combinations of failures can result in severe fuel damage (a severe accident); in this scenario, molten core debris is expected to remain within either the vessel or containment accident (i.e., there is significant system damage, although is not expected to result in any radiological release). These combinations were identified in the set of MELCOR/ADAPT runs.

Figure 6:
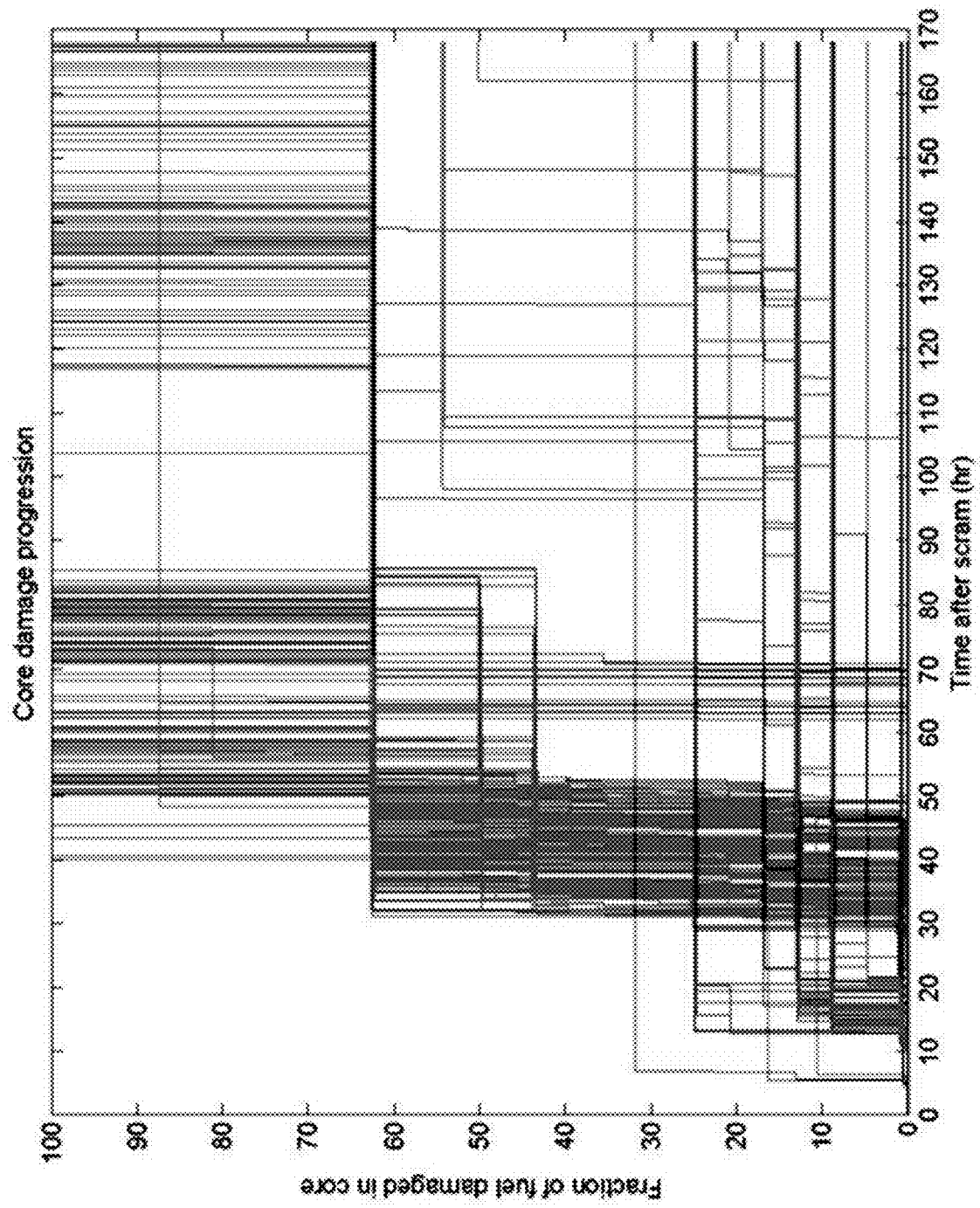
FIG. 6 shows a plot of time-dependent fraction of fuel damage in core for simulated scenarios resulting in core damage according to an embodiment of the invention. Simulations without core-damage end states are omitted from this plot.

Table 1 summarizes the results of those runs, in terms of whether core damage is a possibility for a given valve configuration. For branches with no failures of the DV, FV, or SRV, there was no core damage. FIG. 6 contains plots of the fraction of fuel damage in the core for all of the MELCOR scenarios that resulted in core damage.

FIG. 9 illustrates a subset of MELCOR simulations, which illustrates how one key parameter (RPV water level) varies for different configurations of the SRV, and which configurations can result in core damage. In the event of severe ECCS failure, the operators may attempt to prevent system damage by taking other measures, such as introducing new water into the vessel through the CVCS (Chemical and Volume Control System). However, if CVCS is activated, there is a low probability of providing a containment bypass leak pathway through the CVCS (a charging failure with LOCA), which would cause even greater system damage. Therefore, operators should avoid activating CVCS if they are experiencing an ECCS failure scenario which is expected to produce no fuel damage. It is the task of the operator to infer the extent of the ECCS failure to determine whether or not the protective action of CVCS activation is worth the rare, but potentially negative consequences of, a charging failure with LOCA.

Example 2

Example 2 illustrates a prototype BN-based sSAMG for an IPWR application. The results of the DDET/MELCOR analyses offer insight into how accidents scenarios evolve, given different configurations of the ECCS. This information can be encoded in a BN model that allows operators to infer the configuration of the ECCS, given the observed evolution of their accident scenario. This BN could be used to explore the potential ramifications of corrective actions (e.g., CVCS activation) before implementing the action. Furthermore, the BN provides a means to project the expected status of other plant indicators, and to identify which indicators should be examined to provide confirmation of ECCS configuration diagnosis.

The model-development approach documented in FIG. 2 is implemented to produce a proof-of-principle SAMG for example described above. The status of each of the three valves (FV, DV, and SRV) is included as a node in each model. In this simplified example, each valve can be in one of two states: the open/cycling or the failed closed. The state of each valve is not known a priori, but there is a probability distribution associated with the valve position. In this example, the prior probabilities on the DV, FV, and SRV nodes are drawn from generic failure rates used in PRAs for similar components in current reactors, and the MELCOR/ADAPT results are used to populate conditional probability tables that associated known valve states with the observable parameters. These models were built using a non-random subset of MELCOR simulations described above. The spectrum of DDET/MELCOR results is used to develop a map between the known configuration of ECCS valves and the value of the three plant parameters. The conditional probability for each parameter, at each time, is derived from the set DDET/MELCOR results corresponding to a known configuration of the ECCS valves. Numbers in the models are provided for illustrative purposes—they do not represent the full set of MELCOR simulations, and therefore may not represent the actual likelihoods of various plant configurations and responses Prototype Models Prototype models were developed in GeNIe, which is a Windows-based development environment for graphical decision-theoretic models developed by the University of Pittsburgh Decision Systems Laboratory. GeNIe implements the SMILE library of decision-theoretic method (including BNs) for the development of intelligent systems. Examples of BNs designed to predict the status of ECCS valves and the likelihood that the sequence will progress to core damage are shown in FIG. 5, FIG. 10, and FIG. 11

Figure 5:
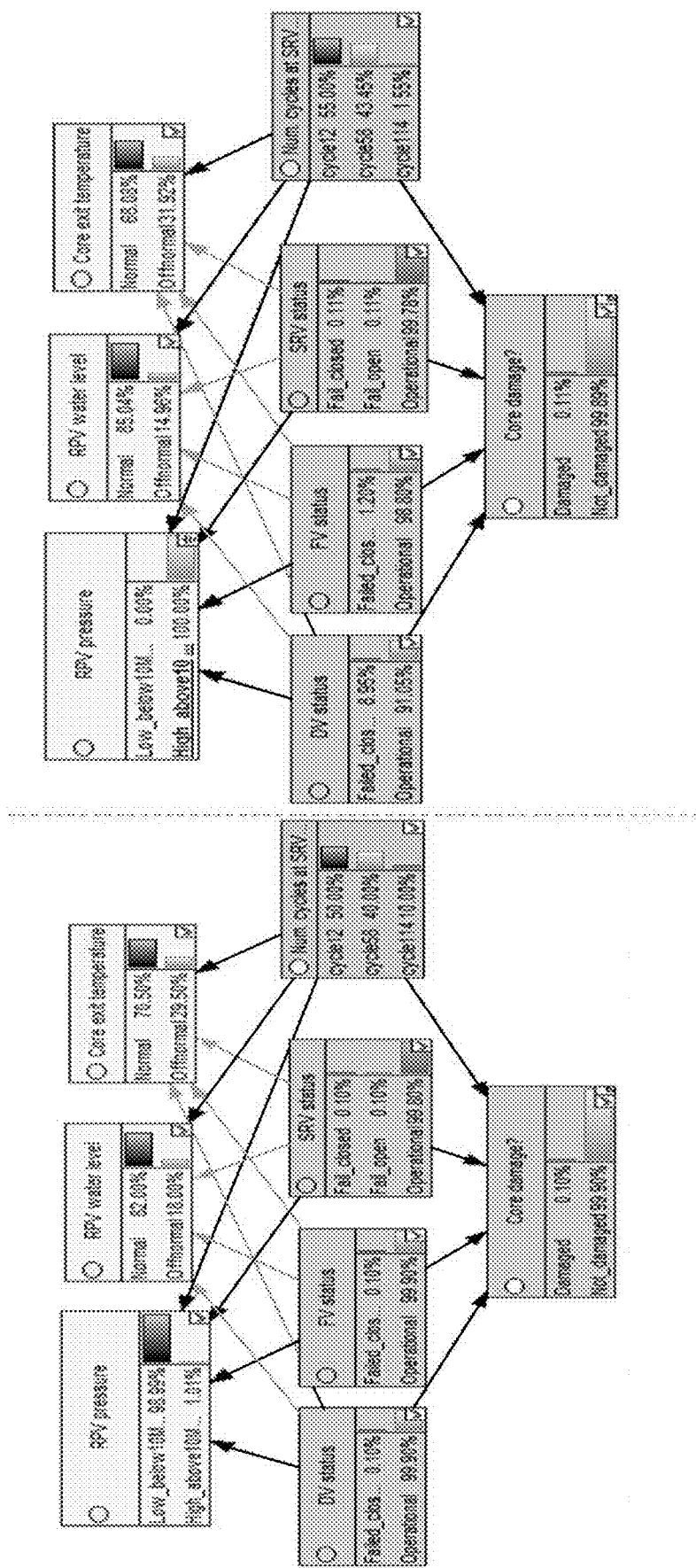
FIG. 5 shows an illustration of a diagnostic support process including BN modeling the status of SRV and ECCS valves and key plant operating parameters according to an embodiment of the disclosure. The left side shows the prior probabilities for all operating conditions. The right side shows how the state probabilities change given high RPV pressure (numerical values are included for illustrative purposes and are not necessarily representative of the system).

FIG. 5 is a BN for a single time-step, included to illustrate how the updating process works. The left side shows the prior (uninstantiated) BN modeling relationships between the failure of the three valves, the number of cycles before SRV failure, three key reactor parameters, and the core damage status. The model structure shows that the status of the DV, FT, and SRV each influence the state of the three plant parameters, and also the core damage status. The right side shows the same BN, instantiated with an observation of "RPV pressure=high." This demonstrates that operators can input into the BN known plant conditions (high reactor pressure), and receive updated information about the likelihood of different valve failures and the likelihood of core damage as well as the expected status of unobserved indicators (such as RPV water level and core exit temperature).

Figure 7:
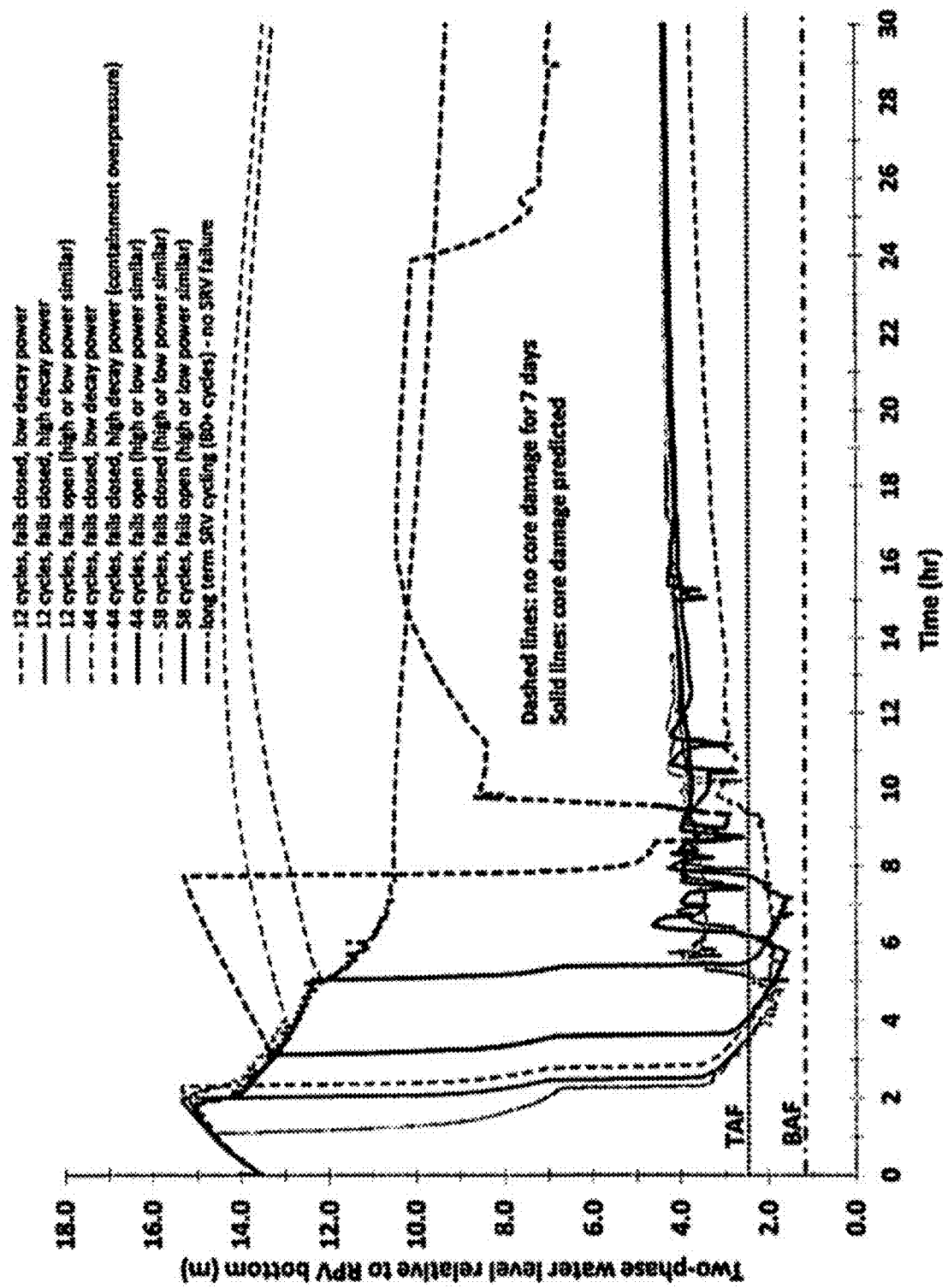
FIG. 7 illustrates a subset of MELCOR simulations, which illustrates how one key parameter (RPV water level) varies for different configurations of the SRV, and which configurations can result in core damage, according to an embodiment of the disclosure.

As can be seen in FIGS. 7, 8, 9 the status of the plant parameters varies over time. Small changes in early parts of the accident can lead to significantly different scenario progression and different core damage outcomes. To handle this dynamic aspect, the simple conceptual model must be expanded to include a temporal aspect (represented by the temporal plate in FIG. 10, which indicates that this is a Dynamic Bayesian Network (DBN)).

Figure 10:
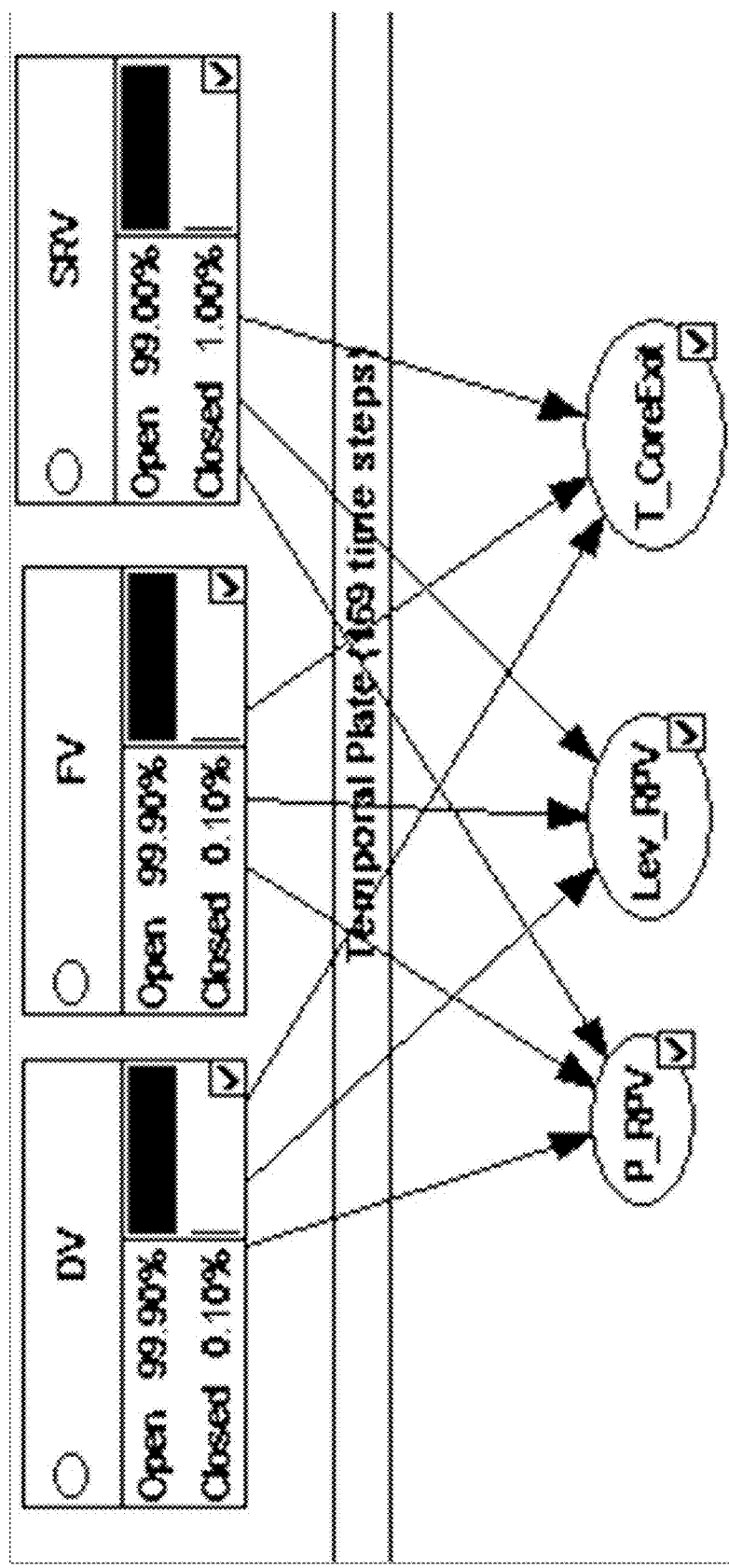
FIG. 10 shows an illustration of plate-based dynamic BN (DBN) modeling the relationship between three valves (DV, FV, SRV) and three key plant operating parameters according to an embodiment of the disclosure.
Figure 11:
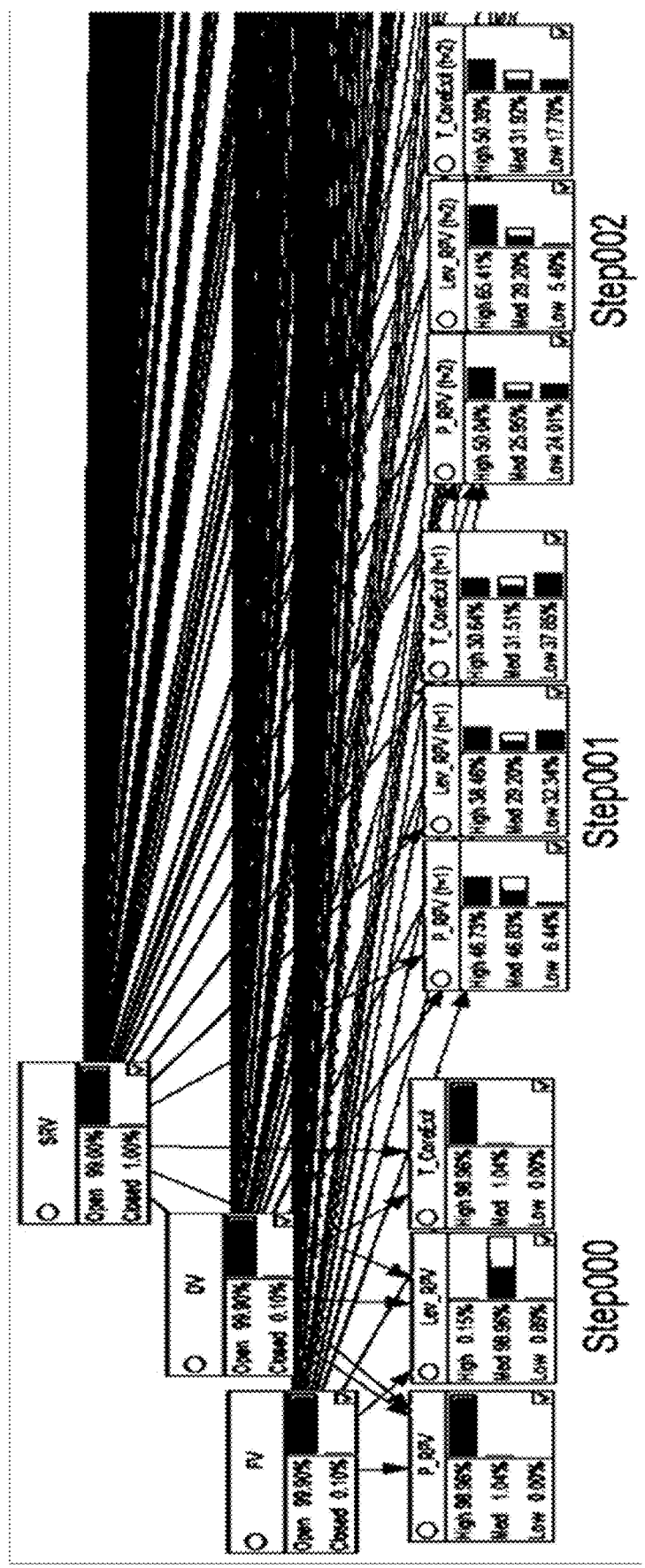
FIG. 11 shows an illustration of a DBN model shown in FIG. 6 according to an embodiment of the disclosure. The first three of 169 time-steps are shown in this model.

FIG. 10 illustrates a dynamic conceptualization of the ECCS diagnosis problem. This figure contains a plate-based dynamic BN modeling the relationship between the three valves and three key plant operating parameters: RPV pressure (P_RPV), RPV water level (Level RPV), and core exit temperature (T_CoreExit). The model structure shows that the status of the DV, FT, and SRV each influence the state of the three plant parameters. The temporal plate indicates that the bottom portion of this model (containing the time-varying reactor parameters) is duplicated to 169 time steps, each representing 1 hour in the accident evolution. The status of the FV, DV, and SRV (as failed closed or as un-failed) remain constant throughout the duration of this model.

FIG. 11 shows an unrolled version of FIG. 10—the first three of the 169 time steps are shown in this figure. As can be seen in FIG. 11, the nodes for FV, DV, and SRV influence the plant parameters at each time step; these equipment statuses are not duplicated at different time steps, because the indicator position is assumed to be consistent (either open/cycling or failed closed) throughout the accident sequence; this assumption could be relaxed in other example models.

The plant parameters are discretized into three different states each (Low, medium, high). Discretization thresholds were chosen based on earlier results. For P_RPV, high corresponds to a predicted pressures above 12 MPa, medium corresponds to 9-12 MPa, and low corresponds to below 9 MPa. For Lev_RPV, high corresponds to above 10.0 m, medium to 4.0-10.0 m, and low to <4.0 m. For T_CoreExit, high corresponds to above 1500K, medium to 700-1500K, and low corresponds to less than 700K.

Figure 12:
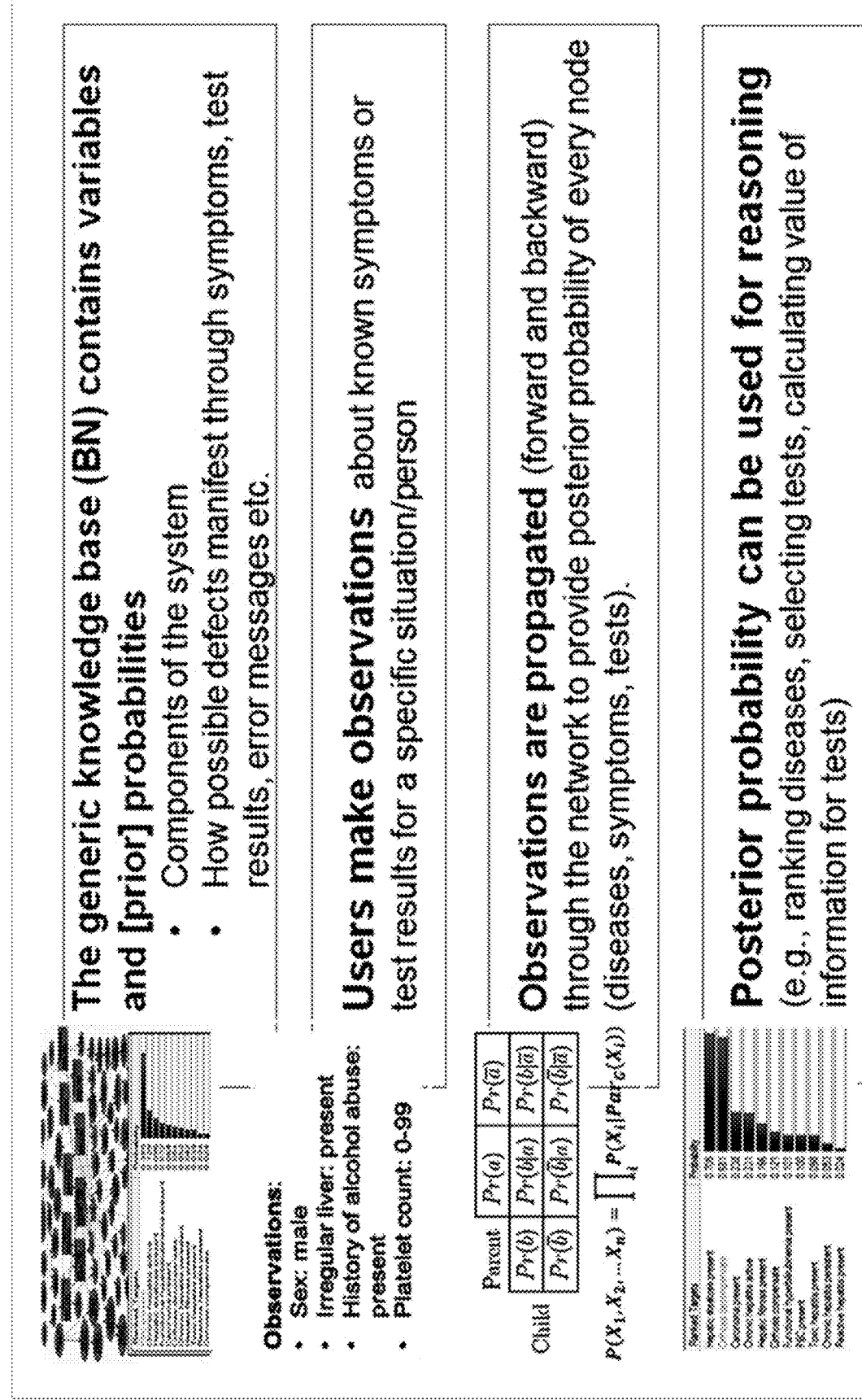
FIG. 12 illustrates the use of BNs for real-time diagnostic support according to an embodiment of the disclosure.

Generic Reasoning with a BN is illustrated in FIG. 12 provides a high-level summary of how BNs are used to provide real time diagnostic support for applications such as disease diagnosis and fault detection. The full BN represents the prior belief about the status of the system. This BN encompasses the full scope of components and parameters that are relevant to diagnosing the system, along with information about how faults, defects, or failures manifest through symptoms, parameter changes, and error messages. This prior model encodes the best-known knowledge about the system into a single framework for reasoning.

Users (e.g., doctors, NPP operators) apply the model to reason about specific situations. The users input a set of known conditions (ranging from the value of a single parameter, up to specification of every parameter in the model) into software. The model then propagates these observations through the network to provide a posterior probability of every unobserved node in the model. This posterior probability distribution can be used for reasoning tasks, including ranking likely diagnoses and identifying parameters to check next.

Using the GeNIe software permits implementation of diagnosis modules with the model. The diagnosis module provides insight into the value provided by additional information (e.g., from checking parameters or performing additional diagnostic tests). These calculations are based on the differential diagnosis method implemented in medical diagnoses. Diagnosis values are based on the expected gain in cross-entropy between the equipment fault and the state of a parameter. The diagnostic value comparisons can be used to help identify the most beneficial source of information for diagnosing a specific condition, or for differentiating between two conditions.

The use of a sSAMG for Real-time Decision Support is illustrated in FIG. 11. The prototype model in FIG. 11 contains the best-available information about the progression of possible ECCS accidents. The probabilities in this model are the prior probabilities. During reasoning (use of the model), observations about the plant status are encoded as evidence on the model, and this evidence is used to automatically update the probabilities in the model. The updating process provides situation-specific posterior probabilities for all unobserved; these posterior probabilities can be used to obtain a refined understanding of the plant status.

As discussed above, the BN can be used for both inference (forward, cause-to-effect) reasoning and diagnosis (backward, effect-to-cause reasoning). Both types of reasoning are implemented simultaneously, which also provides the ability to conduct so-called inter-causal reasoning (e.g., cause-to-effect-to-other-cause, effect-to-cause-to-other-effect).

Figure 13:
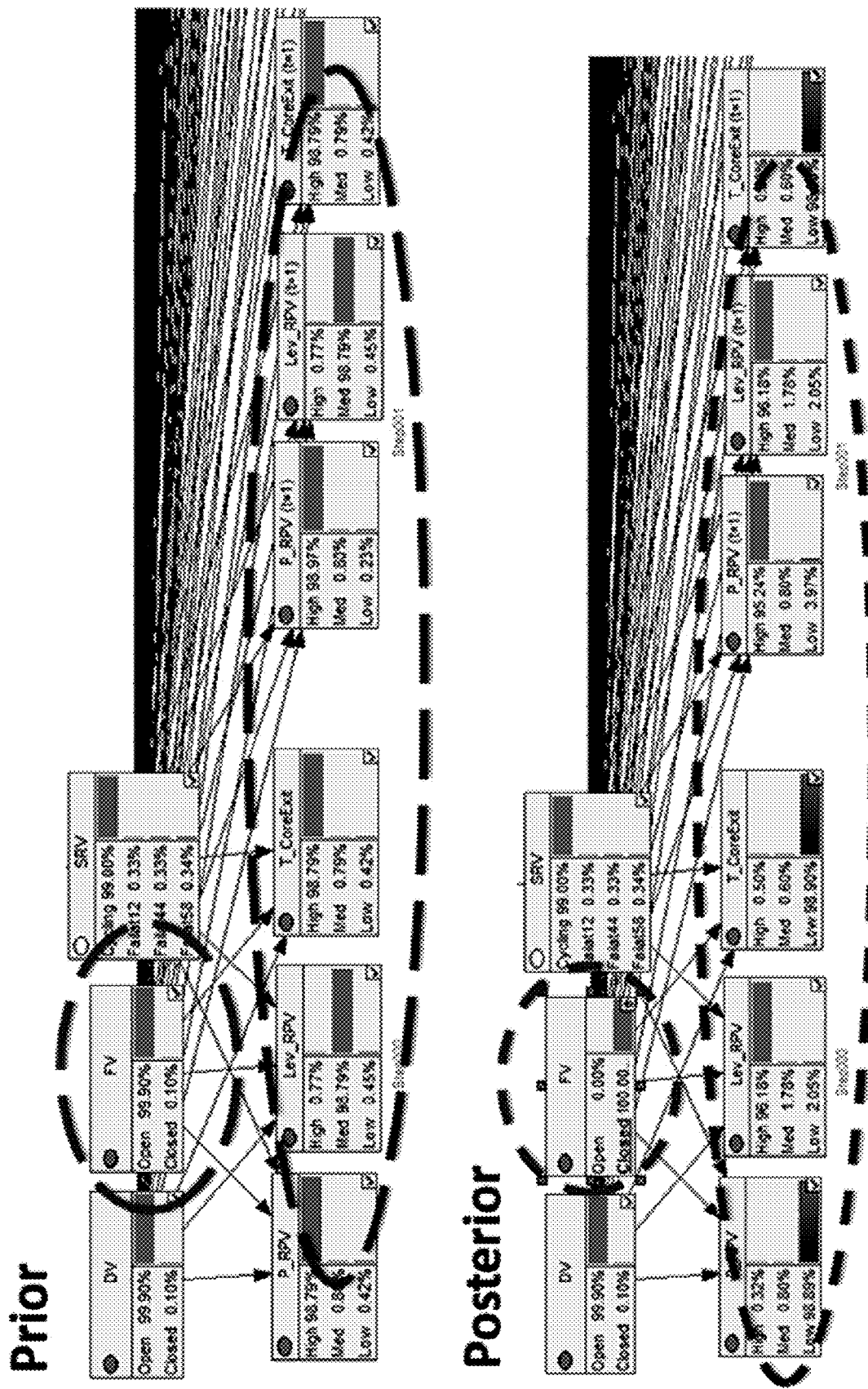
FIG. 13 illustrates forward reasoning (inference) about parameters given updated knowledge about FV status according to an embodiment of the disclosure.

FIG. 13 shows how the prototype model can be used to reason about the value of parameters, given the known state of one of the valves. This is an example of a single iteration of forward reasoning (cause-to-effect). In the figure, changing a belief about the status of the FV (circled in red) from unknown (top model) to closed (bottom model) dramatically changes beliefs about all of the parameters in the first time-steps of the model (circled in green).

Figure 14:
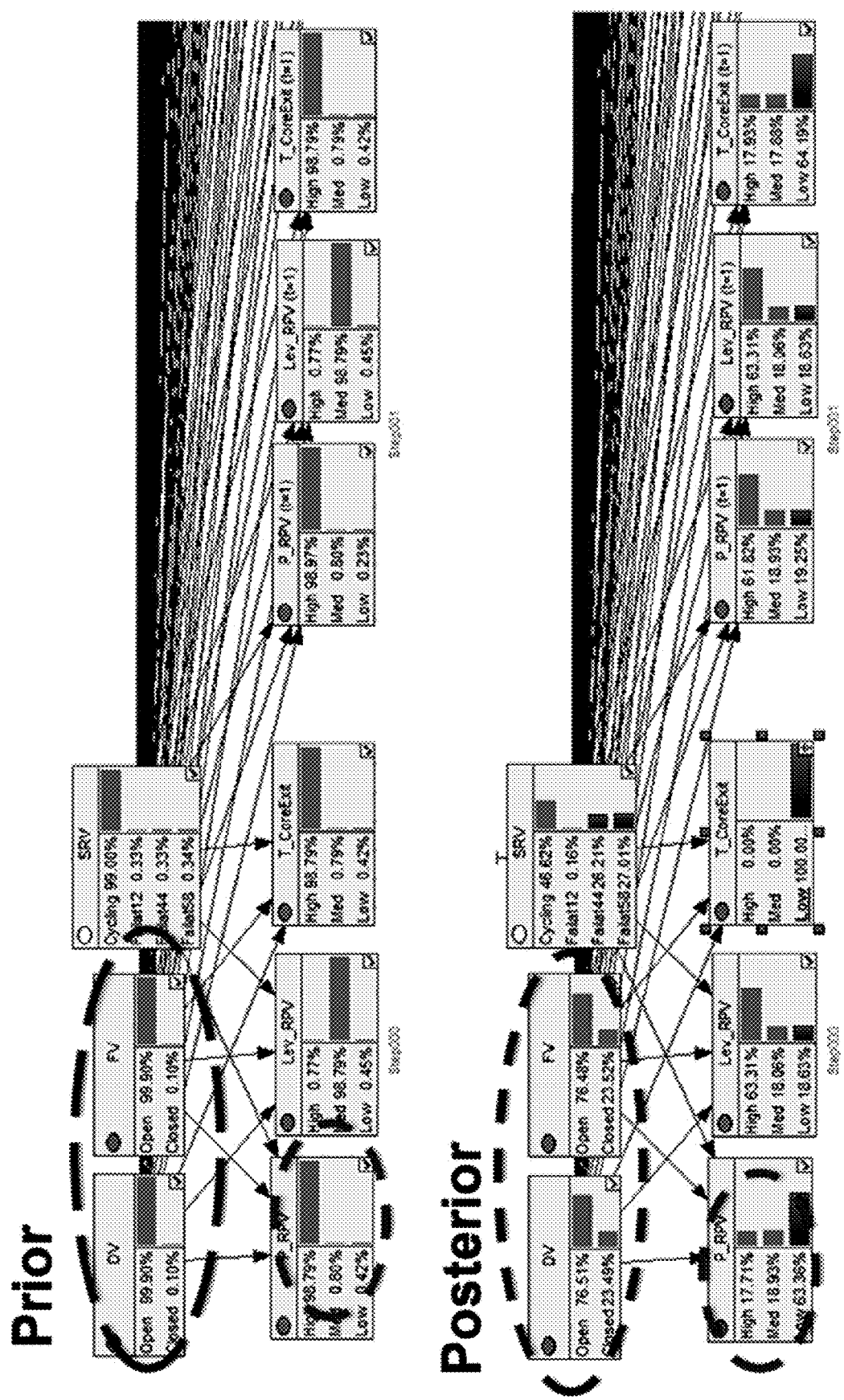
FIG. 14 illustrates backward reasoning (diagnosis) and intercausal reasoning, given knowledge of a single plant parameter according to an embodiment of the disclosure.

The prototype model can also be used to reason about the status of the valves, given knowledge of some of the plant parameters, as shown in FIG. 14. This is an example of backward reasoning (effect-to-cause). On the top, the prior BN shows the prior probabilities for all operating conditions. The posterior BN (on the bottom) shows how the beliefs about equipment status (circled in green) change given a single piece of information (that P_RPV (t=0) is "high"). As the figure shows, the likelihood of a failed-closed DV increases from 0.01% to 68.66% after making this single observation. This figure also demonstrates inter-causal reasoning. Comparison of the unobserved plant parameters (circled in black) shows making the observation on RPV pressure has also changed expectations about the value of the other two parameters at t=0, and about all three parameters at future time steps. For example, the probability of "low" T_CoreExit at (t=1) decreases from 37.85% to 1.30%.

If operators know that a specific valve has failed, they can use this type of model to anticipate future conditions of the reactor (for all subsequent time-steps, not just the few time-steps shown in the figures). Similarly, if operators know the state of a single parameter, at a single time-step, they can gain insight into the likelihood of different configurations of the valves. These models update iteratively, providing new insight each time an observation is entered or retracted. Furthermore, they operator faster-than-real time—observations can be entered or retracted in a matter of seconds. This provides operators with the ability to "experiment" with the model—for example, anticipating the downstream effects of different value configurations. Operators could also explore how anticipated parameter changes change the likelihood of different value failures; this provides the opportunity to explore possible diagnoses for conditions are still evolving.

Figure 15:
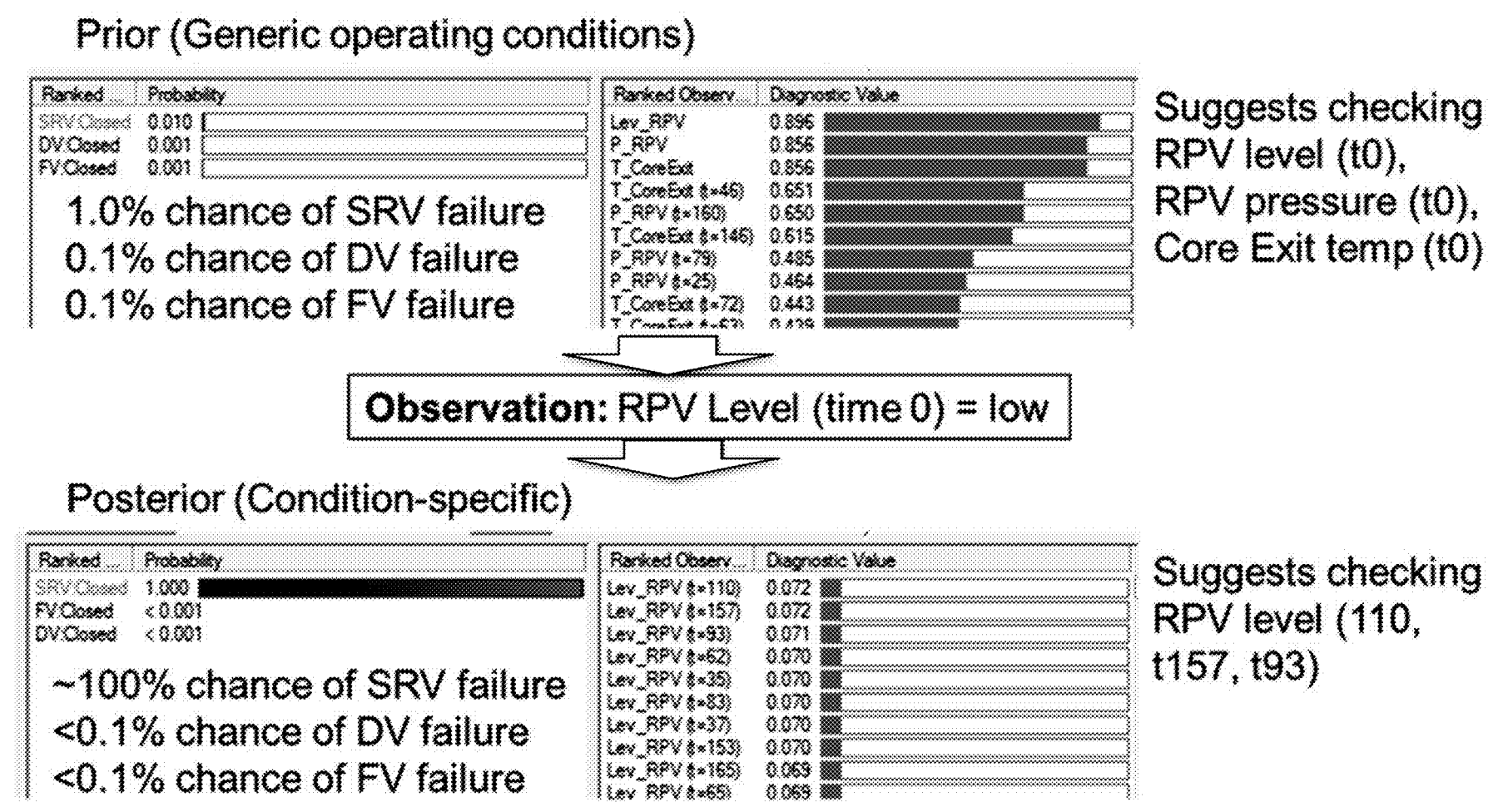

FIG. 15 demonstrates how the diagnosis modules of GeNIe [12] can be used to identify the most beneficial sources of information for diagnosing specific failures. (The underlying model is identical to the model shown in FIG. 11; GeNIe provides user-friendly interfaces for some specific reasoning tasks, including differential diagnosis). The top half of FIG. 15 contains the prior model; the left side shows probabilities for failure of the three valves and the right side shows the diagnostic value (sorted high-to-low) that specific parameter observations provide for diagnosing SRV failure. The "diagnostic value" column contains all of the possible diagnostic parameters in the model (in this case, P_RPV, Lev_RPV, and T_CoreExit), at each time step (t=1 through t=169 hr; the parameters without a (t=#) field are associated with time t=0). For this prior model, three parameters have the highest diagnostic value: Lev_RPV, P_RPV, and T_CoreExit (all at t=0).

The middle of FIG. 15 indicates that a user makes a single observation: Lev_RPV (t=0) is low. The bottom portion of the figure shows updated beliefs about the status of all of the ECCS valves, and also shows updated diagnosis values for other parameters. As can be seen in this figure, the low RPV level at time t=0 provides near-certainty that the SRV is closed, and that the other two valves are not closed. The right side of the figure shows that P_RPV, and T_CoreExit (at t=0) drop off the list of high-value parameters; this indicates that additional information about these parameters is not likely to change the belief about SRV status. The model indicates that Lev_RPV at several future times (110 hr, 157 hr, and 93 hrs) will provide some additional diagnostic value, although the magnitude of the impact will be relatively low.

The results of this example demonstrate that a single key observation can dramatically change belief about ECCS status, and about the value of additional tests. Operators can use this type of information to decide which indicators to check immediately and in the future. Furthermore, operators can use this information to provide insight into whether it is worth delaying action or not. In the example in FIG. 15 (bottom half), the highest value parameter checks occur more than 24 hours after the initial accident. For this example, if operators are faced with a choice between acting now or acting in 2 hours, operators may decide that it is not necessary to delay corrective action, because information obtained in the new 2 hours is not likely to change their understanding of the ECCS status. This type of reasoning system can enable faster response during time-critical severe accidents.

In FIG. 16, the prototype model is used to explore the diagnostic value of all indicators for two different conditions: FV failure (left side) and SRV failure (right side). The left column contains all of the possible diagnostic parameters in the model. Examining both halves of this figure shows that Lev_RPV provides high diagnostic value for both conditions. This indicates that the operators should check Lev_RPV (t=0) first if they are trying to differentiate between an FV failure and an SRV failure. After providing the model with updated information on the value of Lev_RPV, diagnostic values are automatically recalculated, and different parameters are likely to provide the highest diagnostic value. Again, operators can run "what-if" experiments with the model to anticipate the effect of information they could obtain The examples in FIG. 15 and FIG. 16 illustrate the fact that some plant parameters provide greater diagnostic power for some conditions (and also that some plant parameters provide little value for the same conditions). Operators can use this feature of the BN-based SAMG to identify high-value parameters for confirming expected conditions, or for differentiating between two conditions. This type of insight can enable operators to identify which information is most critical information to obtain. This type of insight is especially crucial for severe accidents, such as Fukushima, where large numbers of indicators experienced loss of power, and battery backups were used to power individual indicators. This could also be beneficial for situations where the operators must enter containment to obtain certain information—radiation doses can be reduced if operators focus on obtaining only the most critical information.

Figure 3:
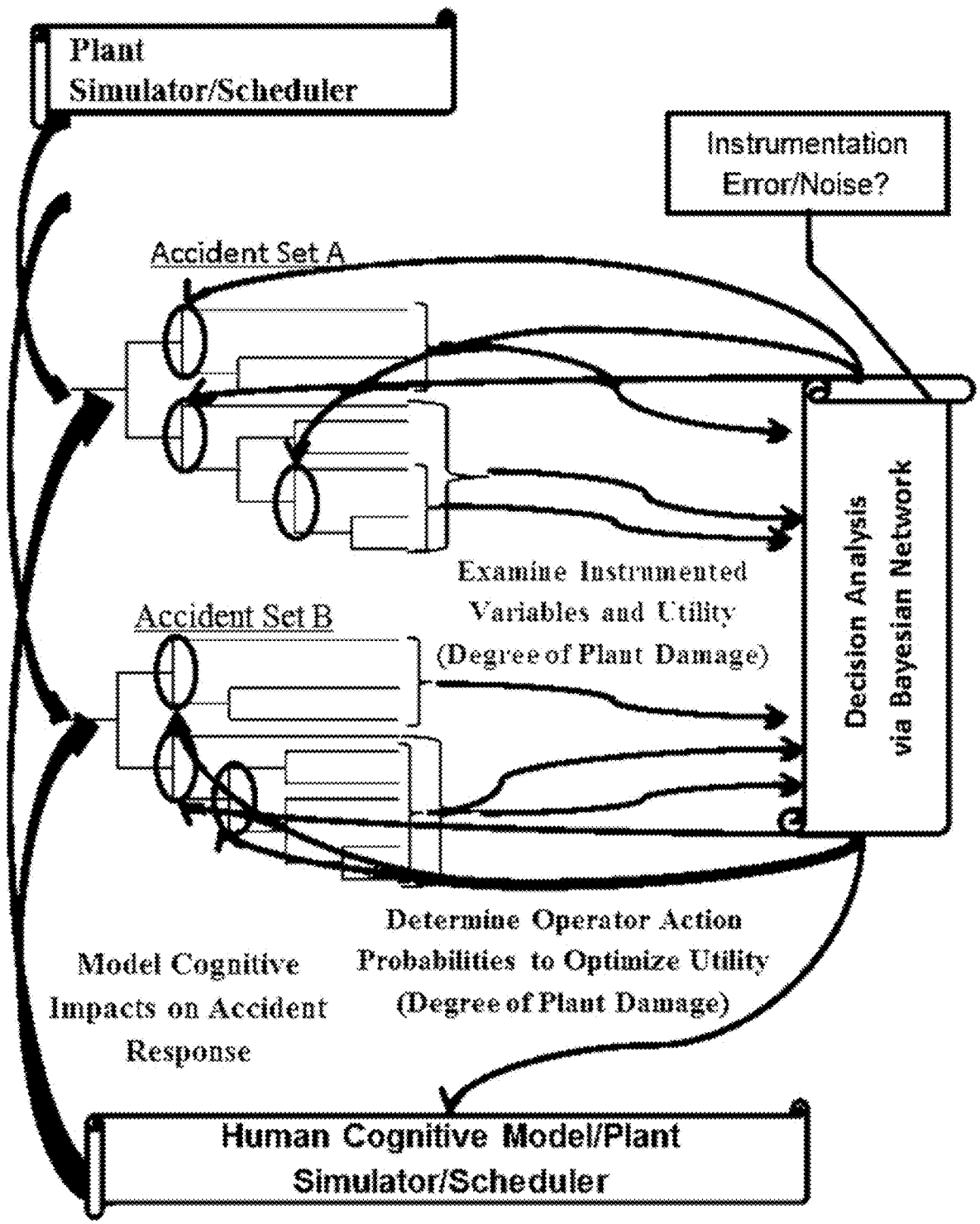
FIG. 3 is an illustration of a diagnostic support process for generating risk-informed diagnosis and response planning support according to an embodiment of the disclosure.

The sSAMGs may be linked into subsequent DDET/MELCOR Simulations to enable response planning. As discussed above, the use of advanced PRA results to develop SAMGs was originally conceptualized to enable the implementation of a crew response module in subsequent simulations; FIG. 3 provides an overview of this iterative process. The prototype SAMG developed above is a tool for diagnosing and exploring the accident space, but it does not provide automated decision recommendations. In order to enable the crew response simulation, the model must provide decision recommendations.

In an embodiment, a path forward has been established to simulate operator decisions in subsequent dynamic system simulations. The general approach is as follows:

Step 1—The diagnostic support tool is developed as indicated in previous sections of the report: prior probabilities are extracted from the DDET, and instrumented variables are extracted from the system simulation.

Step 2—For a subsequent simulation, the BN will be instantiated with the state of instrumented variables from the system simulation. The BN will then calculate the updated (condition-specific) likelihood of different diagnoses; this changes the probability of human decision and action branches in the scenario model. (e.g., impossible branches are pruned, and probabilities associated with each human decision node will be updated to reflect the current system conditions.).

Step 3—Using the new probabilities, resolve the decision tree and produce the most robust course of action.

Step 4—Repeat periodically throughout the accident sequences to ensure that new information does not change the most robust decision.

In an embodiment, a path forward has been established to simulate operator decisions in subsequent DDET/MELCOR simulations. The general approach is as follows:

Step 1—The BN is developed as indicated in previous sections of the report: prior probabilities are extracted from the DDET, and instrumented variables are extracted from the MELCOR analysis.

Step 2—For a subsequent simulation, the BN will be instantiated with the state of instrumented variables from the MELCOR analyses. The BN will then calculate the updated (condition-specific) likelihood of different diagnoses; this changes the probability of human decision and action branches in the DDET. Impossible branches will be pruned and probabilities associated with each decision node in the DT will be updated.

Step 3—Using the new probabilities, resolve the decision tree and produce the most robust course of action.

Step 4—Repeat periodically throughout the accident sequences to ensure that new information does not change the most robust decision.

Figure 17:
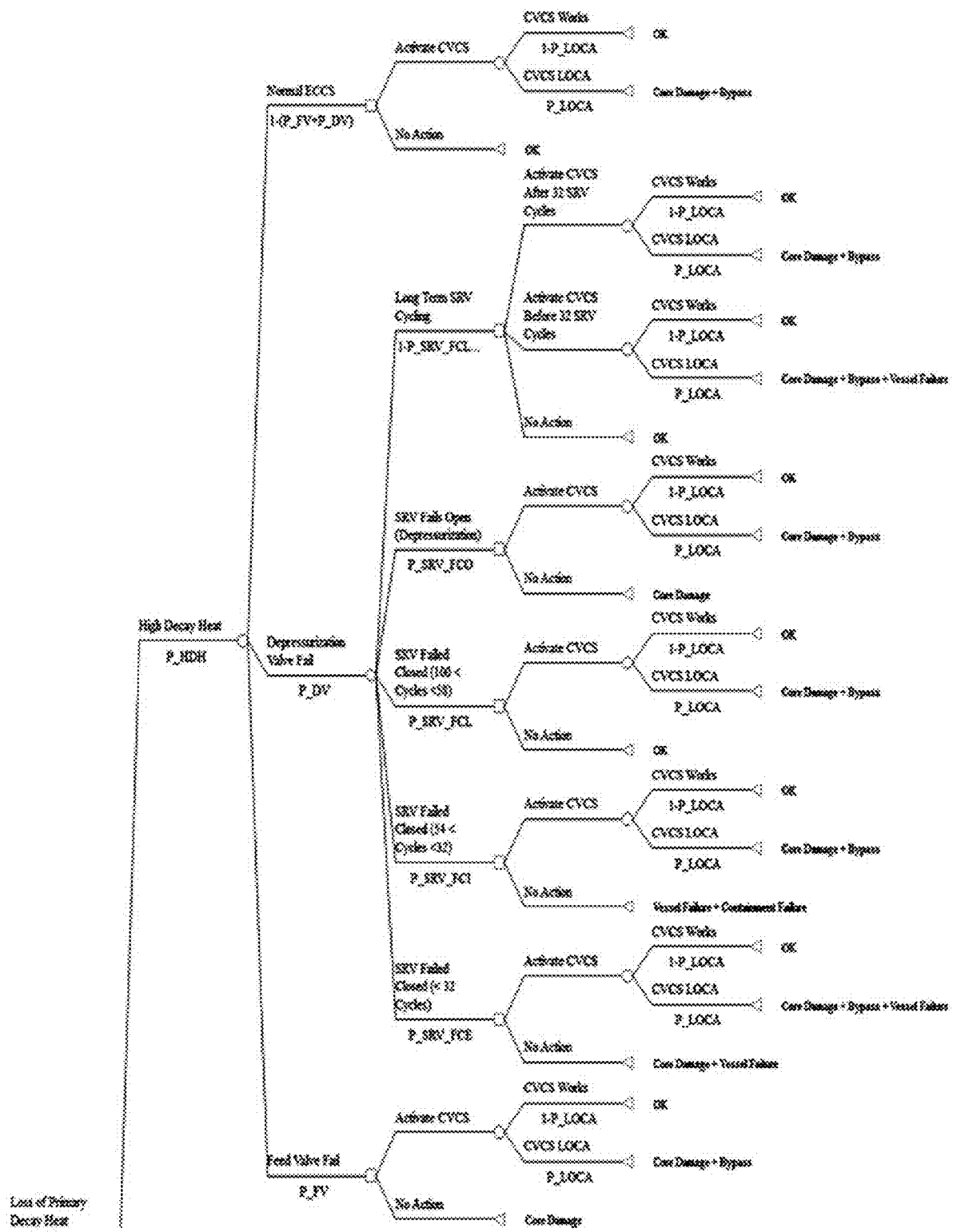
FIG. 17 shows a simplified iPWR decision tree according to an embodiment of the disclosure.
Figure 17:
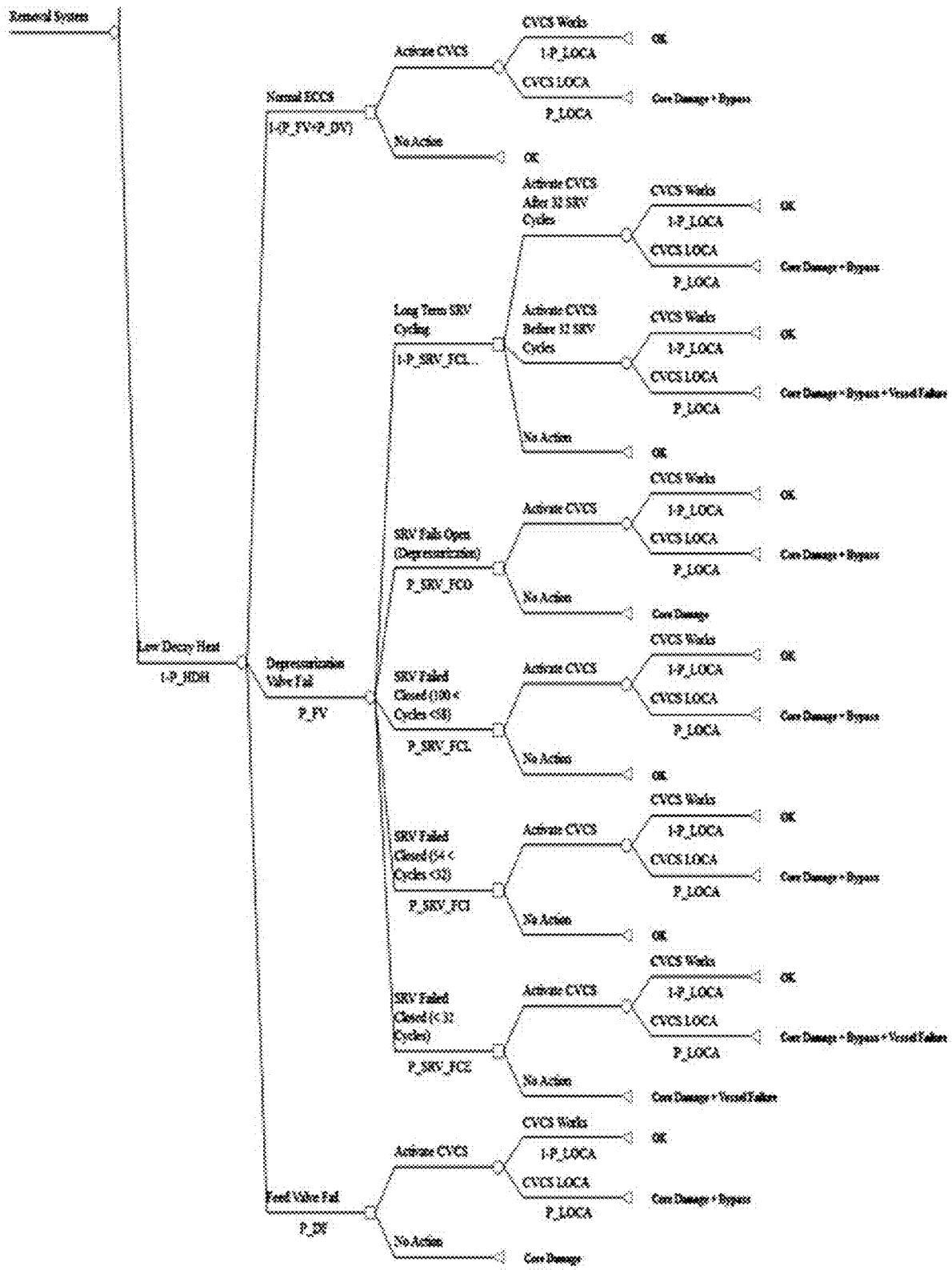

In order to illustrate this process, we present an example associated with a hypothetical DV failure. The operator must decide to either activate the CVCS or do nothing to mitigate this failure. To enable illustration of the example, the DDET described above is simplified into the decision Tree (DT) shown in FIG. 17. In this figure, circles represent uncertain events, squares represent operator decisions, and triangles represent end states. The simplified DT included the three accident sets analyzed (i.e., Normal ECCS Operation, DV Failed Closed, FV Failed Closed) and the major end state bifurcations caused by SRV failure timing and CVCS activation.

Figure 18:
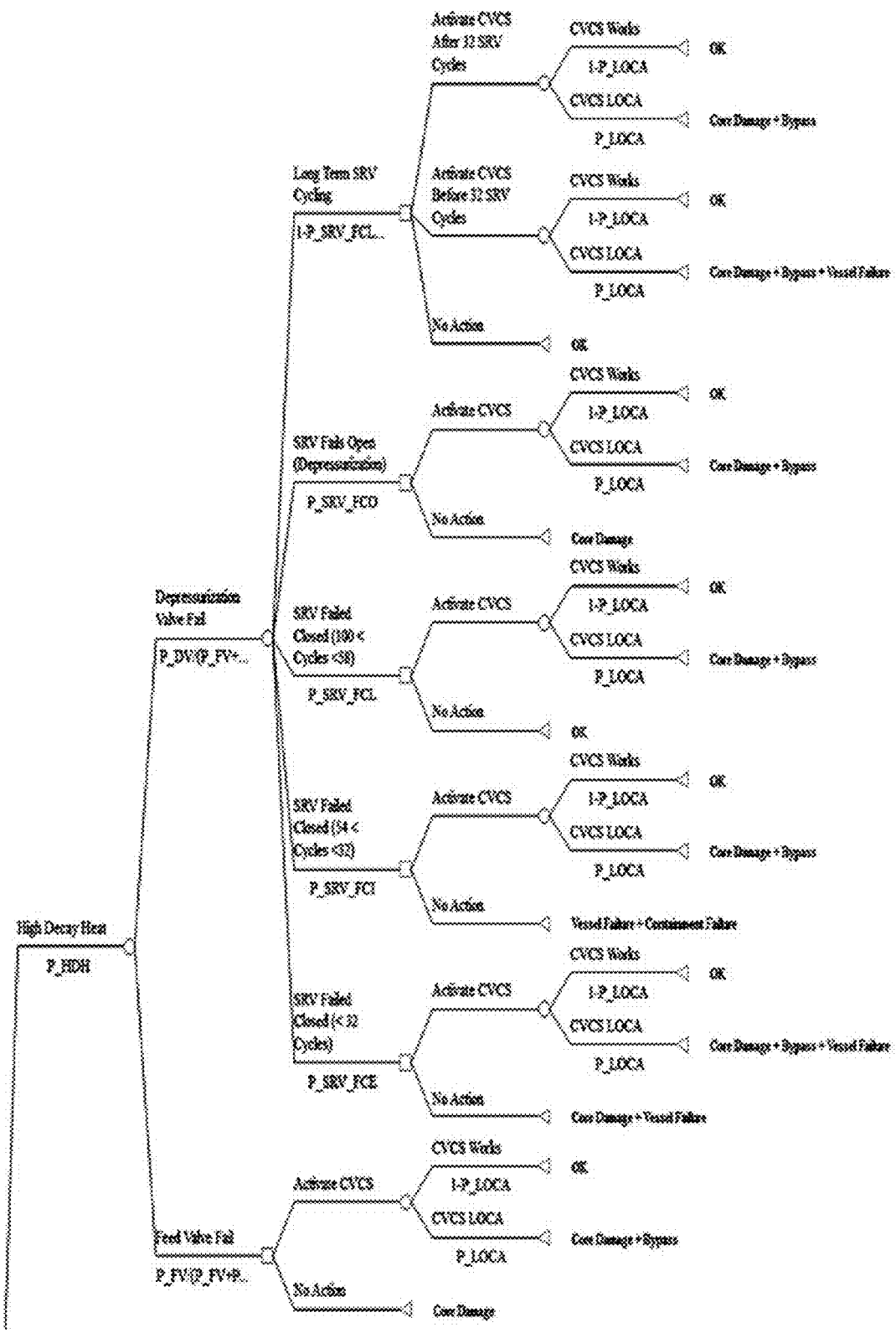
FIG. 18 shows another simplified iPWR decision tree given a failed DV (diagnosed on high RPV pressure) and uncertain FV according to an embodiment of the disclosure.
Figure 18:
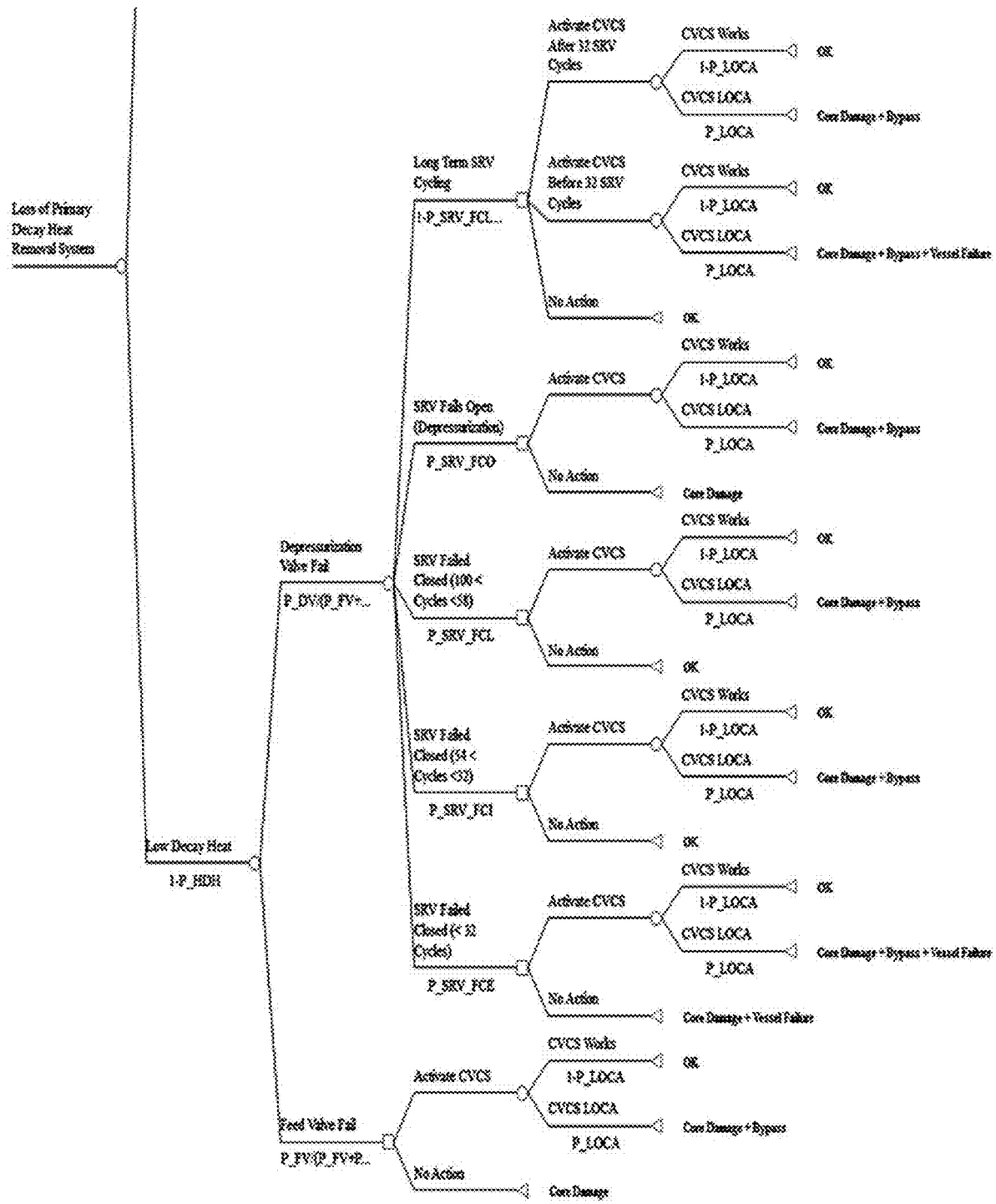

In the case of a DV failure, reactor pressure rises above the DV actuation point and starts to cycle the SRVs. This combination of evidence in the BN will lead to the diagnosis that DV failure has occurred. The BN will assign a de minimis probability to normal ECCS, and branches associated with normal ECCS are pruned from the tree. However, DV failure does not preclude FV failure, so the model cannot assign a de minimis probability to the FV failure. Instead, the probabilities of DV failure (only) and DV and FV failure (together) are both renormalized. The reduced decision tree can be seen in FIG. 18.

It should be noted that, assuming a conservatively high probability of interfacing system LOCA, the decision tree would likely tell the operator to delay CVCS actuation if the SRVs are still deemed to be cycling normally. Even if the BN infers early SRV failure in the closed position, the likelihood of predicted vessel failure (due to a lack of water transfer from the vessel to the containment through the SRV) in addition to core damage for SRV cycling less than 32 times would likely push the operator to avoid CVCS activation and accept a no action core damage end state.

Figure 19:
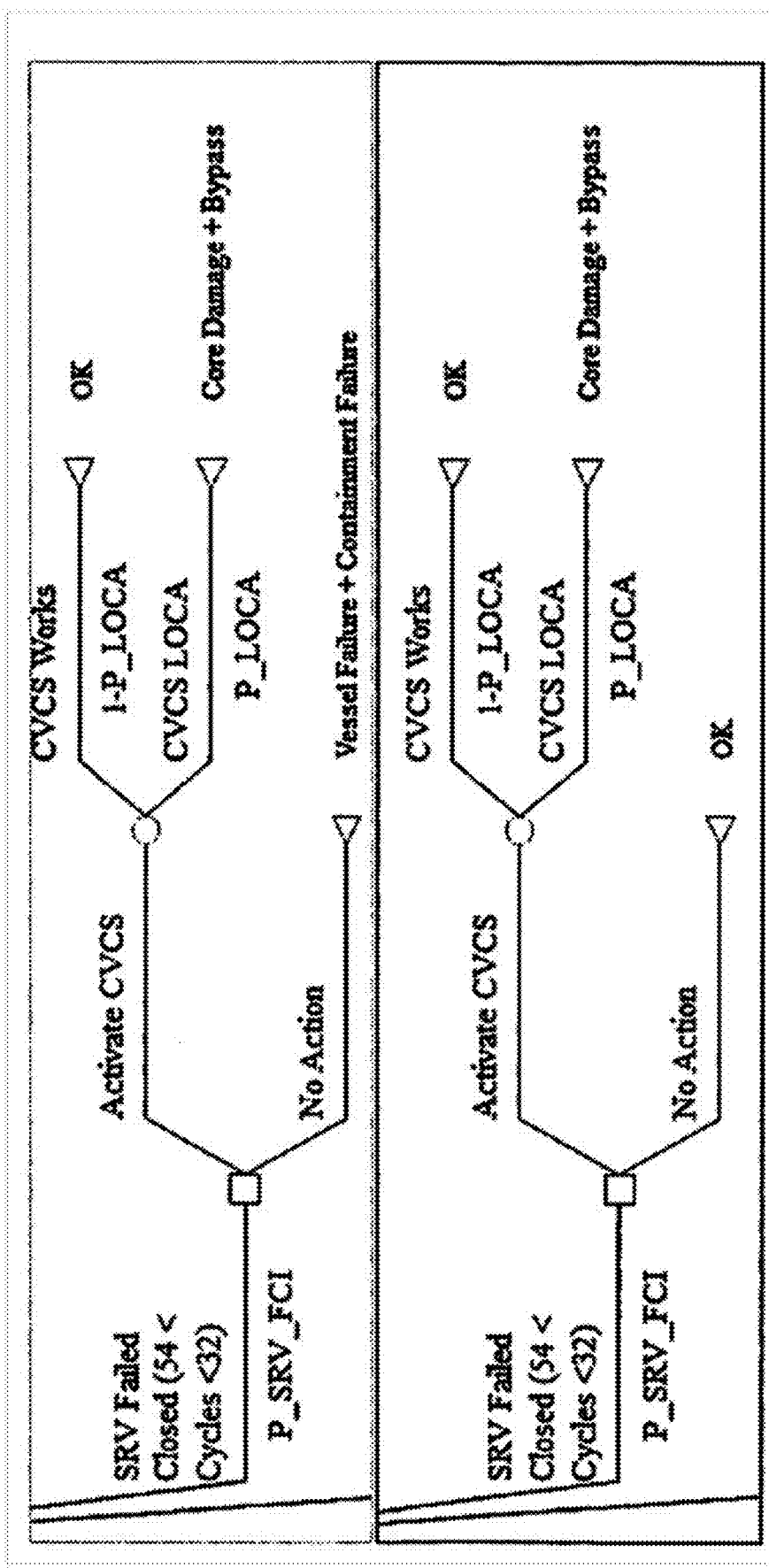
FIG. 19 is an illustration showing bifurcation between the High Decay Heat (Top Half) and Low Decay Heat (Bottom Half) decision nodes according to an embodiment of the disclosure.

After 32 SRV cycles have passed, the operators experience the primary bifurcation between high decay heat and low decay heat in the DDET analysis. Because of the difficulty in differentiating decay heat loads early in accident sequences, these two decision nodes will likely exist in a super-positioned state in the reduced-DT; see FIG. 19 for a comparison of the high decay heat and low decay heat branches.

As the transient progresses the uncertainties in the DV Fail branch reduce, simplifying the decision process by removing branches which no longer apply given the accident progression. The decision to activate the CVCS system is always decided by the superposition of remaining uncertain decision nodes. Once the operator (BN) has enough information to remove decision nodes (e.g., water level in RV increases after containment water level rises above FV initiator level), the decision tree simplifies and the recommended operator action is updated given the new superposition of the remaining uncertain operator decision nodes The disclosed diagnostic support system and methodology tool can also be used to extend the use of risk-information to provide risk management in other areas, including identifying and resolving safety issues. The approach can be used to:
  Enable a structured, science-based approach for rapid development of severe accident guidance;
  Help establish instrumentation design criteria, to ensure that instrument designers focus on only relaying information that the operators need to respond to a severe accident;
  Evaluate the impact of degraded instrumentation;
  Model the impacts of operator interference, control room evacuation, and other unexpected human performance issues on accident progression;
  Risk-informed procedures or SAMGs generated with the disclosed methodology can offer a number of benefits during the occurrence of severe accidents;
  Puts the best-available information from PRA and simulation community in the hands of decision makers;
  Enables faster crew response and reduced delays and mistakes in time-critical situations;
  Reduces coordination/communication challenges that can hinder rapid responses;
  Provides a framework for exploring possible impacts of for high consequence decisions before taking actions; and
  Assist non-operators in understanding response plan implemented by operators.

The disclosed system and process leverages the best information available, and encodes it in a framework that can be used to support operators facing the severe information limitations inherent in severe accidents. The BN-based sSAMG encodes a knowledge base that enhances decision-making in time-critical scenarios (e.g., when plant damage is imminent). The BN-based SAMG synthesizes knowledge from multiple domains into a single framework; this helps reduce the social and organizational challenges associated with assembling and using teams of experts during the early stages of severe accidents.

Using advanced PRA outputs to develop procedures offers risk-informed, science-based accident response solutions (which consider both consequences and likelihood of conditions). The risk-informed sSAMG can be used by operators, by emergency response staff, and by administrators to understand an evolving severe accident and predict the trajectory of an evolving severe accident. The model can be used to enhance the situational awareness of all members of the emergency response team. Operators can use the model to assess which instrumentation is most important for them to collect during a severe accident, or to consider the future consequences of possible actions (or inactions). Instead of "experimenting" on the plant, the operators can "experiment" on the BN model to evaluate the impact of different decisions. The use of BN-based sSAMGs provides a real-time tool for supporting rapid, defensible diagnosis and response during the evolution of the accident.

According to an embodiment, the BN structured methodology may be applied to simulations and component reliability. For example, the BN methodology may be applied to evaluating the status of Emergency Core Cooling System (ECCS) valves in a generic integral pressurized-water reactor (iPWR) design. In another example, the BN methodology may be applied to component failure analysis of advanced small modular reactors, SAMG/EOP development, real-time accident management, Instrumentation & Control (I&C) capability requirements, and training.

According to another embodiment of the disclosure, a system is disclosed for performing the operations of the disclosed methods described above. Referring now to FIG. 20, a block diagram 400 illustrating the general components of a computer according to an embodiment of the disclosure is shown. The computer 400 can be a digital computer that, in terms of hardware architecture, generally includes a processor 402, input/output (I/O) interfaces 404, network interfaces 406, an operating system (O/S) 410, a data store 412, and a memory 414. The components (402, 404, 406, 410, 412, and 414) are communicatively coupled via a local interface 408. The local interface 408 can be, for example but not limited to, one or more buses or other wired or wireless connections, as is known in the art. The local interface 408 can have additional elements, which are omitted for simplicity, such as controllers, buffers (caches), drivers, among many others, to enable communications. Further, the local interface 408 can include address, control, and/or data connections to enable appropriate communications among the aforementioned components. The general operation of a computer comprising these elements is well known in the art.

The processor 402 is a hardware device for executing software instructions. The processor 402 can be any custom made or commercially available processor, a central processing unit (CPU), an auxiliary processor among several processors associated with the computer 400, a semiconductor-based microprocessor (in the form of a microchip or chip set), or generally any device for executing software instructions. When the computer 400 is in operation, the processor 402 is configured to execute software stored within the memory 414, to communicate data to and from the memory 414, and to generally control operations of the computer 400 pursuant to the software instructions.

The I/O interfaces 404 can be used to receive user input from and/or for providing system output to one or more devices or components. User input can be provided via, for example, a keyboard and/or a mouse. System output can be provided via a display device and a printer (not shown). I/O interfaces 404 can include, for example but not limited to, a serial port, a parallel port, a small computer system interface (SCSI), an infrared (IR) interface, a radio frequency (RF) interface, and/or a universal serial bus (USB) interface.

The network interfaces 406 can be used to enable the computer 400 to communicate on a network. For example, the computer 400 can utilize the network interfaces 408 to communicate via the internet to other computers or servers for software updates, technical support, etc. The network interfaces 408 can include, for example, an Ethernet card (e.g., 10BaseT, Fast Ethernet, Gigabit Ethernet) or a wireless local area network (WLAN) card (e.g., 802.11a/b/g). The network interfaces 408 can include address, control, and/or data connections to enable appropriate communications on the network.

A data store 412 can be used to store data. The data store 412 can include any of volatile non-transitory memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 412 can incorporate electronic, magnetic, optical, and/or other types of storage media. In one example, the data store 412 can be located internal to the computer 400 such as, for example, an internal hard drive connected to the local interface 408 in the computer 400. Additionally in another embodiment, the data store can be located external to the computer 400 such as, for example, an external hard drive connected to the I/O interfaces 404 (e.g., SCSI or USB connection). Finally in a third embodiment, the data store may be connected to the computer 400 through a network, such as, for example, a network attached file server.

The memory 414 can include any of volatile non-transitory memory elements (e.g., random access memory (RAM, such as DRAM, SRAM, SDRAM, etc.)), nonvolatile non-transitory memory elements (e.g., ROM, hard drive, tape, CDROM, etc.), and combinations thereof. Moreover, the memory 414 may incorporate non-transitory electronic, magnetic, optical, and/or other types of storage media. Note that the memory 414 can have a distributed architecture, where various components are situated remotely from one another, but can be accessed by the processor 402.

The software in memory 414 can include one or more software programs, each of which includes an ordered listing of executable instructions for implementing logical functions. In the example of FIG. 20, the software in the memory system 414 includes the computer program product for performing the disclosed methods and a suitable operating system (O/S) 410. The operating system 410 essentially controls the execution of other computer programs, such as the interactive toolkit for sourcing valuation, and provides scheduling, input-output control, file and data management, memory management, and communication control and related services. The operating system 410 can be, but is not limited to any of Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or other like operating system with similar functionality.

In an exemplary embodiment of the technology described herein, a computer 400 is configured to perform or execute the steps as depicted in figures and as described in the text of this disclosure. According to an embodiment of the disclosure, a computer program product is configured to perform one or more of the executable programs for constructing risk-informed decision guidelines. The computer program product, located on computer 400, is configured specifically to perform these tasks. In an embodiment, the computer program product is user-driven in a questionnaire style that coaches the user throughout the methodology. The interactive toolkit for performing the executable methods is configurable per user and application.

According to another embodiment of the invention, a computer program product is disclosed for generating a probabilistic map of relationships between known accident scenarios and observed plant parameters. In an embodiment, the computer program product is embedded within a non-transitory computer readable storage medium readable by a processor of a computer and configured to store instructions for execution by the processor for performing a method including:

a) coupling one or more probabilistic assessment methods with a Bayesian network decision support system; and
b) generating a probabilistic map of relationships between known scenarios and observed parameters.

In an embodiment, the method may further include:
c) performing probabilistic queries selected from a group consisting of dynamically diagnosing specific faults, identifying key indicators, and predicting future plant parameters.

Additional executable steps are as described in the method description for constructing risk-informed decision guidelines.

While the disclosure has been described with reference to a preferred embodiment, it will be understood those skilled in the art that various changes may be made and equivalents may be substituted for elements thereof without departing from the scope of the disclosure.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the disclosure.

What is claimed is:

1. A method for responding to a system condition of a system, comprising:
performing a probabilistic assessment by executing instructions on a computer system for a system analysis code to estimate observed parameters comprising incident source terms, incident source term sensitivities and incident source term uncertainties for a variety of scenarios further executed by a simulation tool;
outputting results from the probabilistic assessment into a Bayesian network decision support system being executed on the computer system; and
generating on the computer system a probabilistic map of relationships between the variety of scenarios and observed parameters for the system;
the user using the probabilistic map to provide real-time decision support for a system condition diagnosis and a response plan for the system condition, wherein the real-time decision support includes one or more decision guidelines; and
executing a control action by the user within one of the one or more decision guidelines;

wherein the probabilistic risk assessment methods is selected from a group consisting of a discrete dynamic event tree and a computer model of a progression simulation.

2. The method of claim 1, further comprising:
adding a human simulation model to the one or more probabilistic assessment methods.

3. The method of claim 1, wherein the progression simulations comprise progression simulations of accidents.

4. The method of claim 1, further comprising:
using the probabilistic map to provide real-time decision support for system condition diagnosis and response planning by the user.

5. The method of claim 4, wherein the user is a plant operating crew, technical support center, and other party interested in the progression of accidents.

6. The method of claim 1, wherein the probabilistic map is used to generate starter procedures to be used in safety analyses.

7. The method of claim 1, further comprising:
using the probabilistic map to enable users to perform probabilistic queries selected from a group consisting of dynamically diagnosing specific faults, identifying key indicators, and predicting future plant parameters.

8. The method of claim 1, further comprising:
determining critical operations parameters and diagnosing unknown accidents for an extensive range of possible accident sequences.

9. A method for constructing risk-informed decision guidelines for a system condition of a system, comprising:
performing a probabilistic assessment by executing instructions on a computer system for a system analysis code to estimate observed parameters comprising incident source terms, incident source term sensitivities and incident source term uncertainties for a variety of scenarios further executed by a simulation tool;
outputting the results of the probabilistic risk assessment into a Bayesian network decision support system on a computer;
generating from the computer a probabilistic map of relationships between the system condition and observed system parameters for the; and
performing probabilistic queries using the probabilistic map, the probabilistic queries selected from a group consisting of dynamically diagnosing specific faults, identifying key indicators, and predicting future system parameters;
wherein the probabilistic map is used to provide real-time decision support for system condition diagnosis and a response plan by a user for the system condition, wherein the real-time decision support includes one or more decision guidelines; and
wherein a control action is executed by the user within one of the one or more decision guidelines; and
wherein the system analysis code comprises a discrete dynamic event tree and the simulation tool is a computer model of a progression simulations.

10. The method of claim 9, wherein the risk-informed decision guidelines are selected from a group including Smart Severe Accident Management Guidelines, Emergency Operating Procedures and other types of operating procedures.

11. The method of claim 10, wherein the progression of accidents are in nuclear reactors.

12. The method of claim 9, further comprising:
determining critical operations parameters and diagnosing unknown accidents for an extensive range of possible accident sequences.

13. The method of claim 9, further comprising:
adding a human simulation model to the one or more probabilistic risk assessment methods.

14. The method of claim 9, further comprising:
using the probabilistic map to provide real-time decision support for system condition diagnosis and response planning by a user.

15. The method of claim 14, wherein the user is a plant operating crew, technical support center, and other parties interested in the progression of accidents.

16. The method of claim 9, wherein the probabilistic map is used to generate starter procedures to be used in safety analyses.

17. A computer program product stored on a non-transitory computer readable medium, wherein executed by a process on a computer, the computer program product configured to:
a) output results of a probabilistic assessment into a Bayesian network decision support system; and
b) generate a probabilistic map of relationships between a system condition and observed parameters;
wherein the probabilistic risk assessment methods comprise a discrete dynamic event tree and a computer model of a progression simulations; and
wherein the probabilistic map generates operational procedures for addressing the system condition; and
wherein the probabilistic map is used to provide real-time decision support for system condition diagnosis and a response plan by a user for the system condition, wherein the real-time decision support includes one or more decision guidelines; and
wherein a control action is executed by the user within one of the one or more decision guidelines; and
wherein the probabilistic risk assessment methods comprise a discrete dynamic event tree and a computer model of a progression simulations.

18. The computer program product of claim 17, further comprising:
performing probabilistic queries selected from a group consisting of dynamically diagnosing specific faults, identifying key indicators, and predicting future plant parameters.

* * * * *